(12) United States Patent
Kang et al.

(10) Patent No.: US 9,179,459 B2
(45) Date of Patent: *Nov. 3, 2015

(54) METHOD FOR TRANSMITTING CONTROL INFORMATION AND BASE STATION, AND METHOD FOR RECEIVING CONTROL INFORMATION AND USER EQUIPMENT

(71) Applicant: LG ELECTRONICS INC., Seoul (KR)

(72) Inventors: Ji Won Kang, Anyang-si (KR); Jin Young Chun, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,327

(22) Filed: Oct. 23, 2014

(65) Prior Publication Data

US 2015/0043548 A1  Feb. 12, 2015

Related U.S. Application Data

(63) Continuation of application No. 13/695,264, filed as application No. PCT/KR2011/003140 on Apr. 28, 2011, now Pat. No. 8,942,081.

(60) Provisional application No. 61/329,103, filed on Apr. 29, 2010, provisional application No. 61/346,472, filed on May 20, 2010.

(30) Foreign Application Priority Data

Sep. 10, 2010  (KR) .......................... 10-2010-0088843

(51) Int. Cl.
*H04W 80/04* (2009.01)
*H04W 84/12* (2009.01)
(Continued)

(52) U.S. Cl.
CPC ............. *H04W 72/042* (2013.01); *H04B 7/024* (2013.01); *H04B 7/0452* (2013.01);
(Continued)

(58) Field of Classification Search
USPC .................................. 370/208, 328, 337, 347
See application file for complete search history.

(56) References Cited

U.S. PATENT DOCUMENTS

| | | |
|---|---|---|
| 2009/0253429 A1 | 10/2009 | Lee et al. |
| 2010/0273506 A1 | 10/2010 | Stern-Berkowitz et al. |
| 2010/0285792 A1 | 11/2010 | Chen et al. |
| 2010/0303016 A1 | 12/2010 | Jin et al. |
| 2011/0149886 A1 | 6/2011 | Xu et al. |
| 2011/0269459 A1 | 11/2011 | Koo et al. |

(Continued)

FOREIGN PATENT DOCUMENTS

| | | |
|---|---|---|
| WO | 2008111798 | 9/2008 |
| WO | 2010018978 | 2/2010 |
| WO | 2010036008 | 4/2010 |

OTHER PUBLICATIONS

PCT International Application No. PCT/KR2011/003140, Written Opinion of the International Searching Authority, dated Dec. 29, 2011, 17 pages.

*Primary Examiner* — Andrew Lee
(74) *Attorney, Agent, or Firm* — Lee, Hong, Degerman, Kang & Waimey

(57) ABSTRACT

According to one aspect of the present invention, antennas or antenna nodes spaced away from each other by a predetermined distance or more are configured to be able to transmit control information of mutually different user equipment groups, thereby increasing the efficiency in the operation of control channels. In addition, according to another aspect of the present invention, a resource region for transmitting control information for an improved user equipment, which is a target of a multi-node cooperative transmission, is set differently from a resource region for transmitting control information for a legacy user equipment, thereby increasing the efficiency in the transmission of the control information for the improved user equipment.

10 Claims, 15 Drawing Sheets

(51) Int. Cl.
- *H04W 72/04* (2009.01)
- *H04B 7/02* (2006.01)
- *H04B 7/04* (2006.01)
- *H04L 5/00* (2006.01)
- *H04B 7/26* (2006.01)
- *H04L 27/26* (2006.01)
- *H04W 88/02* (2009.01)

(52) U.S. Cl.
CPC ........... *H04L 5/0032* (2013.01); *H04L 5/0048* (2013.01); *H04L 5/0053* (2013.01); *H04L 5/0076* (2013.01); *H04B 7/2656* (2013.01); *H04L 27/2626* (2013.01); *H04W 88/02* (2013.01)

(56) References Cited

U.S. PATENT DOCUMENTS

| | | | |
|---|---|---|---|
| 2012/0002746 | A1 | 1/2012 | Pham |
| 2012/0163335 | A1 | 6/2012 | Chung et al. |
| 2012/0275400 | A1* | 11/2012 | Chen et al. .................... 370/329 |
| 2013/0003639 | A1* | 1/2013 | Noh et al. ..................... 370/312 |
| 2013/0044664 | A1* | 2/2013 | Nory et al. .................... 370/311 |
| 2013/0094411 | A1* | 4/2013 | Zhang ........................... 370/281 |
| 2013/0265951 | A1* | 10/2013 | Ng et al. ....................... 370/329 |
| 2014/0192786 | A1* | 7/2014 | Skov et al. .................... 370/336 |
| 2014/0334408 | A1* | 11/2014 | Gao et al. ...................... 370/329 |
| 2015/0003316 | A1* | 1/2015 | Kim et al. ..................... 370/312 |
| 2015/0016386 | A1* | 1/2015 | Tamrakar et al. ............. 370/329 |

* cited by examiner

FIG. 11

☐ : RS for antenna 1
☐ : RS for antenna 2
☐ : RS for antenna 3
☐ : RS for antenna 4

☐ : pilot pattern on stream0
☐ : pilot pattern on stream1

METHOD FOR TRANSMITTING CONTROL INFORMATION AND BASE STATION, AND METHOD FOR RECEIVING CONTROL INFORMATION AND USER EQUIPMENT

CROSS-REFERENCE TO RELATED APPLICATIONS

This application is a continuation of U.S. patent application Ser. No. 13/695,264, filed on Oct. 29, 2012, now U.S. Pat. No. 8,942,081, which is the National Stage filing under 35 U.S.C. 371 of International Application No. PCT/KR2011/003140, filed on Apr. 28, 2011, which claims the benefit of earlier filing date and right of priority to Korean Patent Application No. 10-2010-0088843, filed on Sep. 10, 2010, and also claims the benefit of U.S. Provisional Application Nos. 61/329,103, filed on Apr. 29, 2010, and 61/346,472, filed on May 20, 2010, the contents of which are all hereby incorporated by reference herein in their entirety.

TECHNICAL FIELD

The present invention relates to a wireless communication system. More specifically, the present invention relates to a method of transmitting control information regarding a user equipment in a multi-node system supporting multi-node coordinated transmission and a base station thereof, and a method of the user equipment receiving the control information and the user equipment.

BACKGROUND ART

With development of the information industry, a technology that is capable of transmitting various large amounts of data at high speed has been required. To this end, research has been conducted into a multi-node or multi-cell coordinated transmission method that simultaneously performs communication at multiple nodes using the same resource. In the multi-node or multi-cell coordinated transmission method, the respective nodes perform coordinated transmission, thereby providing higher performance than when signals are transmitted without coordination.

A multi-node system supporting multi-node coordinated communication uses a plurality of nodes, each of which operates as a base station, an access point, an antenna, an antenna group, or a radio remote header (RRH). The nodes may be managed by a base station or a base station controller which controls operations of the nodes or performs scheduling. In the multi-node system, distributed nodes are connected to a base station or a base station controller, which manages a plurality of nodes spaced apart from each other by a predetermined distance or more in a cell, through a cable or a dedicated line. The multi-node system may be considered as a kind of Multiple Input Multiple Output (MIMO) system in that distributed nodes can support a single user equipment or multiple user equipments by simultaneously transmitting and receiving different data streams. In terms of the MIMO system, the multi-node system transmits signals using nodes distributed at various positions. Consequently, a transmission area covered by each antenna is reduced as compared with a centralized antenna system (CAS), and therefore, transmit power can be reduced. In addition, the transmission distance between an antenna and a user equipment is reduced, resulting in a decrease in path loss and enabling data transmission at high speed. This can improve transmission capacity and power efficiency of a cellular system and satisfy communication performance of relatively uniform quality regardless of user locations in a cell. Furthermore, a base station(s) or a base station controller(s) connected to a plurality of distributed nodes cooperate with each other in the multi-node system, and therefore, signal loss is reduced, and correlation and interference between antennas and reduced. According to the multi-node coordinated transmission method, therefore, it is possible to obtain a high signal to interference-plus-noise ratio (SINR).

Consequently, the multi-node coordinated transmission method may be used with or replace the conventional centralized antenna system (CAS) to become a new foundation of cellular communications in order to reduce base station installation cost and backhaul network maintenance cost and, at the same time, to extend service coverage and to improve channel capacity and SINR in a next-generation mobile communication system.

In terms of a standard, MIMO transmission must also be achieved in a multi-node system in order to secure high data capacity required by current and future communication standards. Actually, IEEE 802 and 3GPP, two large standardization organizations, are essentially considering MIMO transmission in a process of discussing a communication standard technology. However, the current communication standards have been designed in consideration of only a CAS. As a result, it is difficult to apply an advanced technology, such as an MIMO technology, to the multi-node system. For development of a future communication system, therefore, it is necessary to establish a communication standard supporting the multi-node system.

DISCLOSURE

Technical Problem

The present invention provides a method of efficiently transmitting control information in a multi-node system.

Also, the present invention provides a method of providing information indicating a node used to transmit control information or data of a user equipment, which is one of a plurality of nodes of a multi-node system, to the user equipment.

Also, the present invention provides a method of efficiently transmitting control information regarding an improved user equipment manufactured according to a communication standard of a multi-node system in a situation in which the improved user equipment and a legacy user equipment manufactured according to a communication standard which does not support multi-node coordinated transmission coexist.

Technical Solution

The present invention relates to a wireless communication system. Particularly in a multi-node system supporting wireless communication through a plurality of nodes, control information or data transmitted for each antenna or each antenna node are differently set to efficiently use a wireless resource. According to the present invention, control information received by user equipments may be different from each other even if the user equipments belong to the same cell.

Also, according to the present invention, in a situation in which an improved user equipment manufactured according to a communication standard of a multi-node system and a legacy user equipment manufactured according to a communication standard which does not support multi-node coordinated transmission coexist, a region to which control information regarding the legacy user equipment and a region to which control information regarding the improved user equipment are differently set, and therefore, it is possible to efficiently transmitting control information regarding the improved user equipment.

In accordance with one aspect of the present invention, there is provided a method of transmitting control information at a base station in a distributed antenna system including a plurality of distributed antennas spaced apart from each other by a predetermined distance or more. The method comprises: transmitting first control information regarding one or more legacy user equipments supporting communication according to a centralized antenna system on a first resource region and transmitting second control information regarding one or more improved user equipments supporting communication according to the distributed antenna system on a second resource region different from the first resource region.

In accordance with another aspect of the present invention, there is provided a base station for transmitting control information in a distributed antenna system, The base station comprises: a plurality of distributed antennas spaced apart from each other by a predetermined distance or more and a processor configured to control the distributed antennas to transmit first control information regarding one or more legacy user equipments supporting communication according to a centralized antenna system on a first resource region and to control the distributed antennas to transmit second control information regarding one or more improved user equipments supporting communication according to the distributed antenna system on a second resource region different from the first resource region.

In accordance with another aspect of the present invention, there is provided a method of receiving control information at an improved user equipment supporting communication according to a distributed antenna system including a plurality of distributed antennas spaced apart from each other by a predetermined distance or more. The method comprises: receiving second control information regarding one or more improved user equipments including the improved user equipment from at least one of the distributed antennas, wherein the second control information is received on a second resource region different from a first resource region, on which first control information regarding one or more legacy user equipments supporting communication according to a centralized antenna system is transmitted.

In accordance with yet another aspect of the present invention, there is provided an improved user equipment supporting communication according to a distributed antenna system including a plurality of distributed antennas spaced apart from each other by a predetermined distance or more.

The user equipment comprises: a receiver configured to receive signals transmitted from the distributed antennas and a processor configure to control the receiver to receive second control information regarding one or more improved user equipments including the improved user equipment from at least one of the distributed antennas, wherein the processor detects the second control information on a second resource region different from a first resource region, on which first control information regarding one or more legacy user equipments supporting communication according to a centralized antenna system is transmitted.

In the respective aspects of the present invention, the first control information may be transmitted on the first resource region through each of the distributed antennas, and the second control information may be transmitted on the second resource region through some or all of the distributed antennas.

In the respective aspects of the present invention, control information regarding a first user equipment group including one or more improved user equipments may be transmitted on the second resource region through a first antenna group including one or more distributed antennas, and control information regarding a second user equipment group including one or more improved user equipments, which is different from the first user equipment group, may be transmitted on the second resource region through a second antenna group including one or more distributed antennas.

In the respective aspects of the present invention, at least one of size information and position information of the second resource region, and stream number information may be transmitted to a user equipment.

In the respective aspects of the present invention, the second control information may be advanced MAP (A-MAP) information or PDCCH information. If the second control information is the A-MAP information, the second resource region may be located at a Contiguous Resource Unit (CRU) in a primary frequency partition in which the first resource region is located or at a Distributed Resource Unit (DRU) in a frequency partition except the primary frequency partition. If the second control information is the PDCCH information, the second resource region may be located at a predetermined number of symbols following a symbol(s) of a subframe at which the first resource region is located or at one or more PRBs in a PDSCH region of the subframe.

In accordance with one aspect of the present invention, there is provided a method of transmitting control information at a base station of a cell including a plurality of distributed antennas spaced apart from each other by a predetermined distance or more. The method comprises: transmitting first control information regarding a first user equipment group including one or more user equipments on a predetermined resource region through a first antenna group comprising one or more distributed antennas and transmitting second control information regarding a second user equipment group including one or more user equipments, which is different from the first user equipment group, on the predetermined resource region through a second antenna group comprising one or more distributed antennas.

In accordance with another aspect of the present invention, there is provided a base station for transmitting control information in a distributed antenna system. The base station comprising: a plurality of distributed antennas spaced apart from each other by a predetermined distance or more and a processor configured to control a first antenna group including one or more distributed antennas to transmit first control information regarding a first user equipment group including one or more user equipments on a predetermined resource region and to control a second antenna group including one or more distributed antennas to transmit second control information regarding a second user equipment group including one or more user equipments, which is different from the first user equipment group, on the predetermined resource region.

In accordance with another aspect of the present invention, there is provided a method of receiving control information at a user equipment in a cell including a plurality of distributed antennas spaced apart from each other by a predetermined distance or more. The method comprises: receiving, from at least one of a plurality of antenna groups each of which includes one or more distributed antennas and transmits control information regarding different user equipment groups on a predetermined resource region, control information of a user equipment group to which the user equipment belongs; and detecting control information of the user equipment from the received control information.

In accordance with yet another aspect of the present invention, there is provided a user equipment in a cell including a plurality of distributed antennas spaced apart from each other by a predetermined distance or more. The user equipment comprises: a receiver configured to receive signals transmitted from the distributed antennas and a processor configure to control the receiver to receive, from at least one of a plurality of antenna groups each of which includes one or more distributed antennas and transmits control information regarding different user equipment groups on a predetermined resource region, control information of a user equipment group to which the user equipment belongs; and to receive control information of the user equipment from the received control information.

In the respective aspects of the present invention, antenna information indicating the first antenna group may be transmitted to the first user equipment group, and antenna information indicating the second antenna group may be transmitted to the second user equipment group.

In the respective aspects of the present invention, the first control information may be masked using an identifier of the first antenna group, and the second control information may be masked using an identifier of the second antenna group.

In the respective aspects of the present invention, the first control information may be scrambled using a scrambling sequence corresponding to the first antenna group, and the second control information may be scrambled using a scrambling sequence corresponding to the second antenna group.

In the respective aspects of the present invention, each user equipment belonging to the first user equipment group and the second user equipment group may transmit information regarding a preferred antenna group which will transmit control information of the corresponding user equipment.

In the respective aspects of the present invention, the preferred antenna group information may include a reference signal identifier for each antenna group.

The aforementioned technical solutions are only a part of the embodiments of the present invention, and various modifications to which technical features of the present invention are applicable will be understood by those of ordinary skill in the art to which the present invention pertains, based on the following detailed description of the present invention.

Advantageous Effects

According to the present invention, it is possible to efficiently transmit control information in a system based on a communication standard supporting multi-node coordinated transmission, i.e. a multi-node system.

According to the present invention, control information for different user equipments is transmitted from different antennas or nodes through the same time and frequency resources, thereby improving efficiency in operation of a control channel.

Also, according to the present invention, information indicating an antenna or a node used to transmit control information or data of a user equipment, which is one of a plurality of nodes of a multi-node system, is provided to the user equipment. Consequently, it is possible for the user equipment to effectively receive or detect control information or data thereof.

Also, according to the present invention, in a situation in which an improved user equipment manufactured according to a standard that is capable of supporting multi-node coordinated transmission and a legacy user equipment manufactured according to a communication standard which does not support multi-node coordinated transmission coexist, it is possible to efficiently transmitting control information regarding the improved user equipment.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 11 is a view showing an example of a reference signal used in 3GPP LTE/LTE-A.

BEST MODE

Figure 1:
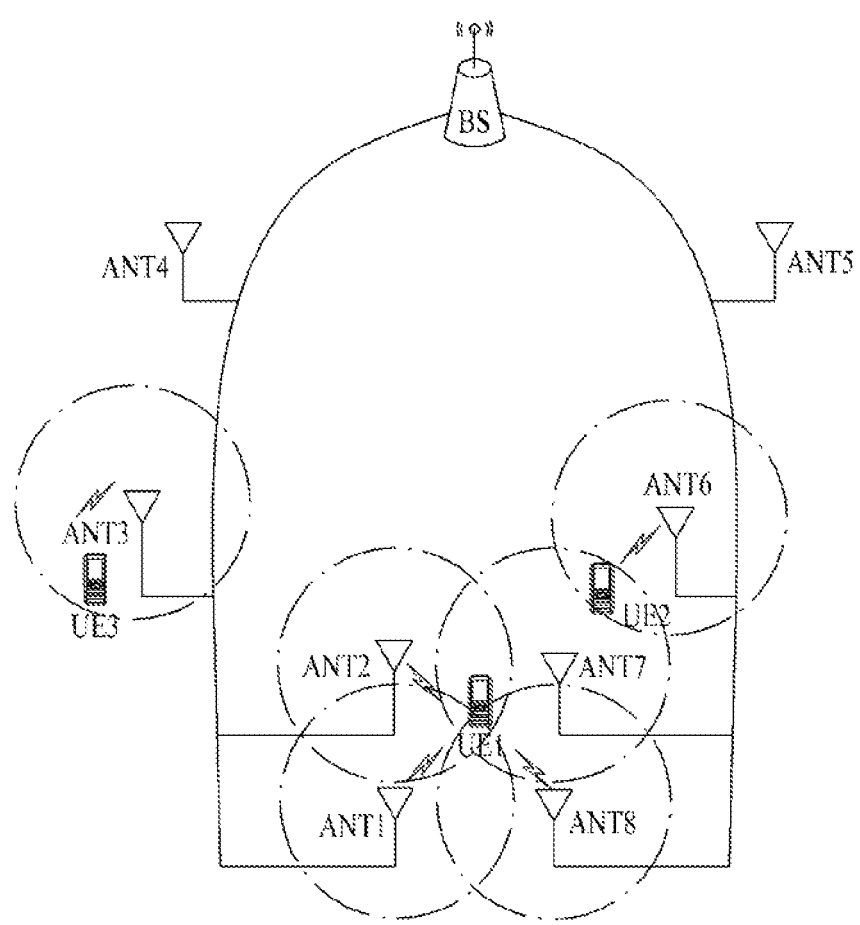
FIG. 1 is a view showing an example of a DAS structure to which the present invention is applied.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters. For example, a case in which a mobile communication system will be described as being a 3GPP LTE system or an IEEE 802.16m system in the following detailed description. Except for matters unique in 3GPP LTE or IEEE 802.16m, however, the present invention may be applied to other arbitrary mobile communication systems.

In some cases, in order to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

A wireless communication system, to which the present invention is applied, includes at least one base station (BS) 11. Each base station provides a communication service to a user equipment (UE) located at a specific geographical region (generally referred to as a cell). The user equipment may be fixed or movable. The user equipment may include various devices that communicate with a base station to transmit and receive user data and/or various kinds of control information. The user equipment may be referred to as a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. The base station is a fixed station that performs communication with a user equipment and/or another base station and exchanges various kinds of data and control information with the user equipment and another base station. The base station may be referred to by other terms such as an evolved-NodeB (eNB), a Base Transceiver System (BTS), an Access Point (AP), and a processing server (PS).

A cell region, to which the base station provides a service, may be divided into a plurality of smaller regions in order to improve system performance. Each smaller region may be referred to as a sector or a segment. A Cell Identity (CellI_ID or IDCell) is given based on the entire system, whereas a sector or segment identity is given based on a cell region, to which the base station provides a service. Generally, user equipments may be distributed in a wireless communication system in a state in which the user equipments are fixed or movable. Each user equipment may communicate with one or more base stations through an Uplink (UL) and a Downlink (DL) at an arbitrary moment.

The present invention may be applied to various kinds of multi-node systems. For example, embodiments of the present invention may be applied to a distributed antenna system (DAS), a macro node having low-power RRHs, a multi-base station coordinated system, a pico- or femto-cell coordinated system, and a combination thereof. In a multi-node system, one or more base stations connected to a plurality of nodes may be coordinated to simultaneously transmit a signal to a user equipment or simultaneously receive a signal from the user equipment.

The DAS uses a plurality of distributed antennas connected to a base station or a base station controller, which manages a plurality of antennas spaced apart from each other by a predetermined distance or more in an arbitrary geographical region (also referred to as a cell), through a cable or a dedicated line in order to perform communication. In the DAS, each antenna or each antenna group may be a node of the multi-node system according to the present invention. Each antenna of the DAS may serve as a subset of antennas provided at the base station or the base station controller. That is, the DAS is a kind of multi-node system, and a distributed antenna or antenna group is a kind of node in a multi-antenna system. The DAS is different from a centralized antenna system (CAS), in which a plurality of antennas is concentrated at the center of a cell, in that a plurality of antennas provided at the DAS is spaced apart from each other by a predetermined distance in a cell. The DAS is different from a femto- or pico-cell coordinated system in that all antennas located in a cell are not managed by a distributed antenna or a distributed antenna group but are managed by a base station or a base station controller at the center of the cell. Also, the DAS is different from an ad-hoc network or a relay system which uses a base station connected to a relay station (RS) in a wireless fashion in that distributed antennas are connected to each other via a cable or a dedicated line. Also, the DAS is different from a repeater which simply amplifies and transmits a signal in that a distributed antenna or a distributed antenna group transmits a signal different from another distributed antenna or another distributed antenna group to a user equipment located adjacent to a corresponding antenna or a corresponding antenna group according to a command from a base station or a base station controller.

The respective nodes of the multi-base station coordinated system or the femto- or pico-cell coordinated system serve as independent base stations and cooperate with each other. Consequently, each base station of the multi-base station coordinated system or the femto- or pico-cell coordinated system may be a node of the multi-node system according to the present invention. The multiple nodes of the multi-base station coordinated system or the femto- or pico-cell coordinated system are connected to each other through a backbone network and perform scheduling and/or handover together, thereby performing coordinated transmission or reception. A system in which a plurality of base station participates in coordinated transmission as described above may be referred to as a Coordinated Multi-Point (CoMP) system.

Various kinds of multi-node systems, such as the DAS, the macro node having low-power RRHs, the multi-base station coordinated system, and the pico- or femto-cell coordinated system, are different from each other. However, since these systems are different from a single-node system (for example, the CAS, the conventional MIMO system, the conventional relay system, the conventional repeater system, etc.), and a plurality of nodes of these systems are coordinated to participate in providing a communication service to a user equipment, embodiments of the present invention may be applied to all of these systems. Hereinafter, the present invention will be described mainly based on the DAS as an example for the convenience of description. However, the following description is merely an illustration. Also, an antenna or an antenna group of the DAS may correspond to a node of another multi-node system, and a base station of the DAS may correspond to one or more coordinated base stations of another multi-node system. Consequently, the present invention may also be applied to another multi-node system in the same manner.

FIG. 1 is a view showing an example of a DAS structure to which the present invention is applied. A base station shown in FIG. 1 may include a plurality of antennas located at the center of a cell according to a CAS. For the convenience of description, however, only DAS antennas are shown in FIG. 1.

Referring to FIG. 1, a DAS, in which a plurality of antennas connected to a single base station located in a cell in a wired fashion is distributed at various positions in the cell, may be variously implemented according to the number and position of the antennas. For example, a plurality of antennas may be distributed at predetermined intervals in the cell, or two or more antennas may be located at a specific position in a dense state. In the DAS, in a case in which coverage of the distributed antennas overlap irrespective of the form in which the distributed antennas are located in the cell, it is possible to transmit a signal having rank 2 or more. For reference, rank indicates the number of transmission layers (3GPP LTE term) or the number of transmission streams (IEEE 802.16 term) that can be simultaneously transmitted through one or more antennas. For example, for spatial multiplexing in SU-MIMO, rank may be defined as the number of transmission layers or the number of transmission streams that can be used by a user allocated to a predetermined resource region.

Spatial multiplexing serves to simultaneously transmit different signals using one or more antennas. For reference, a transmission layer or a transmission stream is an output value of a layer mapper 303 and means an information path input to a precoder. A transmission layer or a layer is a term used in 3GPP. In IEEE 802.16, an information path input to a precoder 304 is referred to as a transmission stream, or an MIMO stream, or a data stream. In IEEE 802.16, on the other hand, an MIMO layer is an information path input to an MIMO encoder corresponding to the layer mapper 303 in IEEE 802.16. In IEEE 802.16, an MIMO layer represents a channel coding block.

Referring to FIG. 1, a base station serving a cell region is connected to a total of 8 antennas in a wired fashion. The respective antennas may be located in the cell at regular intervals having a predetermined distance or more or at various intervals. In the DAS, it is not necessary to use all of the antennas connected to the base station. A proper number of antennas may be used based on a signal transmission range of each antenna, a degree of coverage overlap of neighboring antennas, an interference effect between neighboring antennas, and the distance between each antenna and a mobile user equipment.

For example, in a case in which three user equipments (UE1 to UE3) are located in the cell, and UE1 is located within signal transmission ranges of ANT1, ANT2, ANT7, and ANT8, as shown in FIG. 1, UE1 may receive a signal from one or more selected from among ANT1, ANT2, ANT7, and ANT8. On the other hand, the distance between UE1 and ANT3, ANT4, ANT5, and ANT6 is great with the result that path loss may occur, and power consumption may increase. Also, signals transmitted from ANT3, ANT4, ANT5, and ANT6 may be negligible.

As another example, UE2 is located at a portion at which signal transmission ranges of ANT 6 and ANT7 overlap with the result that signals transmitted through the other antennas are negligible except ANT 6 and ANT7. UE3 is located within a distance close to ANT3, and therefore, only a signal transmitted from ANT 3, of signals transmitted from ANT 1 to ANT8, is dominant.

In a case in which a plurality of antennas is spaced apart from each other in the cell, as shown in FIG. 1, the DAS may be operated as an MIMO system. The base station may communicate with UE1 through antenna group 1 including at least one of ANT1, ANT2, ANT7, and ANT5. At the same time, the base station may communicate with UE2 through antenna group 2 including at least one of ANT6 and ANT7. At the same time, the base station may communicate with UE3 through ANT5. At this time, ANT 4 and ANT5 may perform transmission for UE3 and UE2, respectively, or may be turned off.

That is, when the DAS communicates with a single user or a plurality of users, various numbers of data streams may be transmitted to each user equipment, and the antenna or the antenna group assigned to each mobile user equipment located in the cell served by the base station may be variously present. Based on the position of each mobile user equipment located in the cell, the antenna or the antenna group performing communication with the corresponding user equipment may be specified but may be adaptively changed depending upon movement of each mobile user equipment in the cell.

Figure 2:
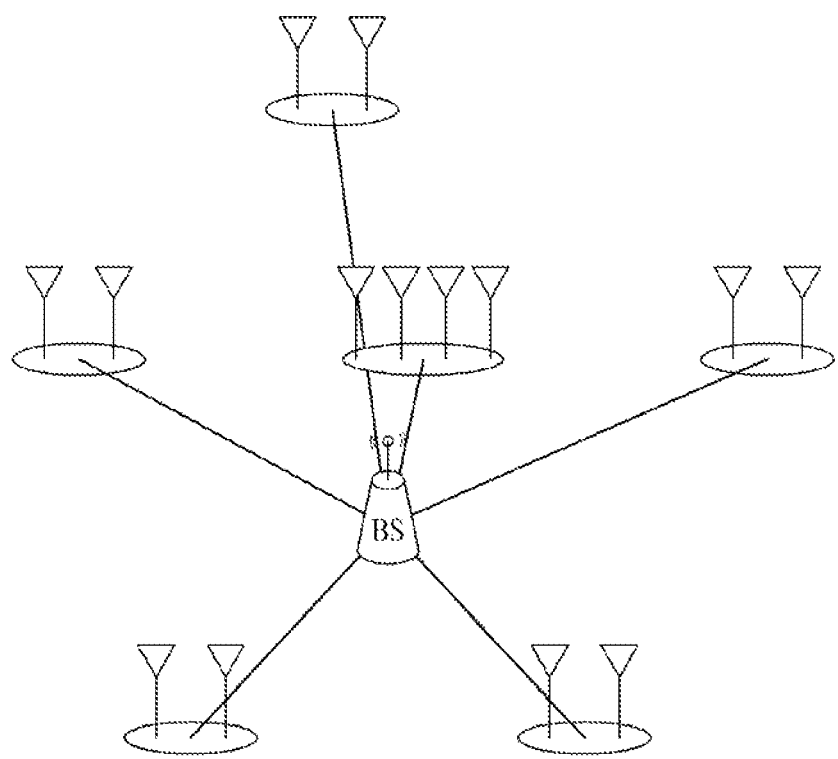
FIG. 2 is a view showing an example of a DAS configuration to which the present invention is applied.

FIG. 2 is a view showing an example of a DAS configuration to which the present invention is applied.

Referring to FIG. 2, the DAS includes a base station and antenna nodes connected to the base station. The antenna nodes are connected to the base station in a wired/wireless fashion. Each of the antenna nodes may include one to several antennas. Generally, antennas belonging to one antenna node have characteristics that the distance between the nearest antennas is less than a few meters, and therefore, the antennas belong to the same regional spot. An antenna node serves as an access point, to which a user equipment can access. The antenna node may also be referred to as an antenna cluster.

Figure 3:
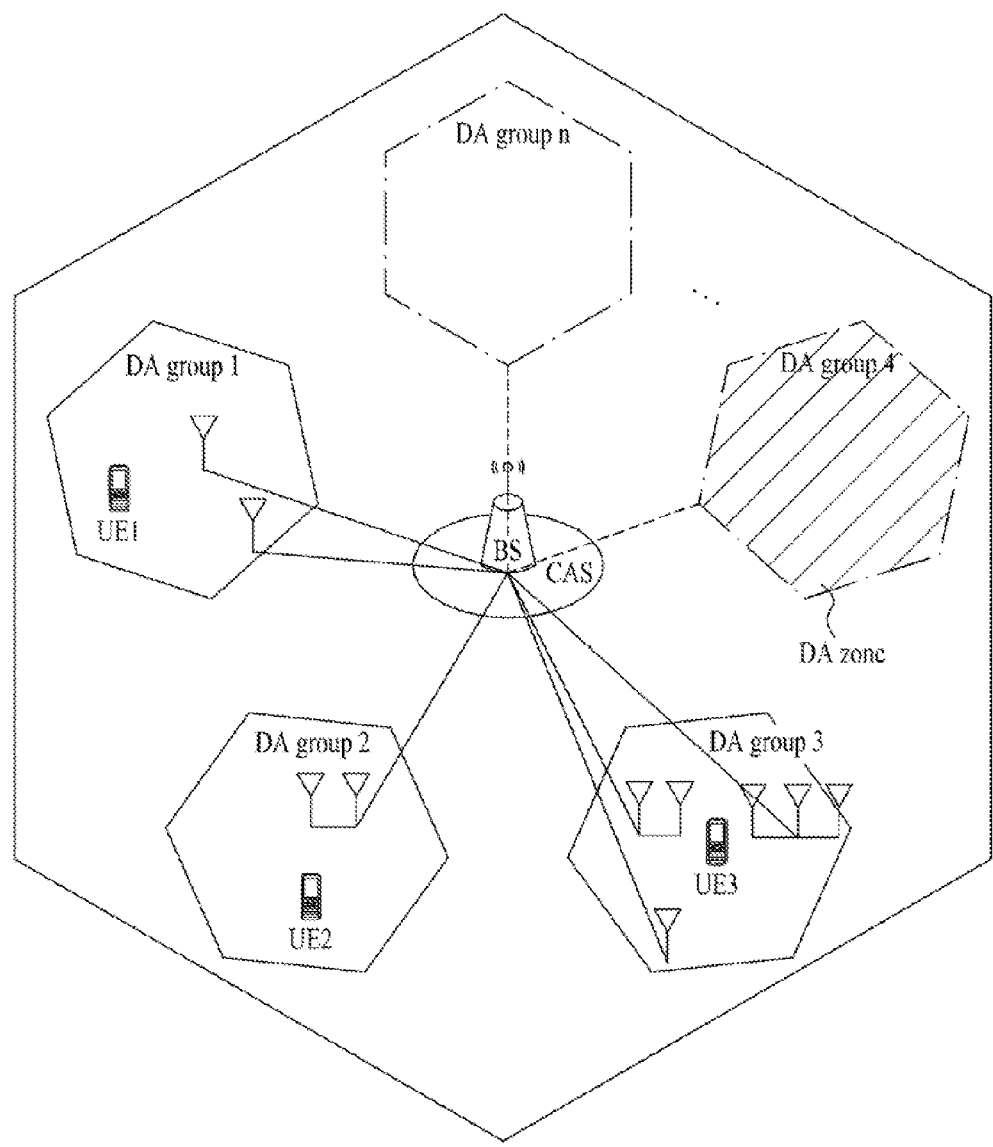
FIG. 3 is a view showing another example of the DAS configuration to which the present invention is applied.

FIG. 3 is a view showing another example of the DAS configuration to which the present invention is applied. Specifically, FIG. 3 shows an example of a system structure in a case in which a DAS is applied to centralized antenna system using conventional cell-based multi antennas.

Referring to FIG. 3, a plurality of centralized antennas (CAs), the distance between the antennas is less than the radius of a cell, and therefore, the antennas exhibit similar path loss effects, may be located at a region adjacent to a base station according to an embodiment of the present invention. Also, a plurality of distributed antennas (DAs), in which the distance between the antennas is equal to or greater than a predetermined value and is greater than the distance between the CAs, and therefore, the antennas exhibit different path loss effects, may be located in the cell region.

Each DA includes one or more antennas connected to the base station in a wired fashion. Each DA may have the same meaning as an antenna node for DAS or an antenna node. One or more DAs form a DA group, thereby forming a DA zone.

A DA group includes one or more DAs. The DA group may be variably configured depending upon the position or reception state of a user equipment or may be fixedly configured with the maximum number of antennas used in MIMO. A DA zone is defined as a range within which antennas constituting a DA group can transmit or receive a signal. The cell region shown in FIG. 3 includes n DA zones. A user equipment belonging to each DA zone may perform communication with one or more of the DAs constituting the DA zone. Upon transmitting signals to user equipments belonging to DA zones, the base station may simultaneously use DAs and CAs, thereby improving a transmission rate.

FIG. 3 shows a CAS structure using the conventional multi antennas in which the CAS includes a DAS so that a base station and user equipments uses the DAS. The positions of CAs and DAs are shown as being divided from each other for simplicity of description. However, the positions of CAs and DAs are not limited thereto. The CAs and DAs may be variously positioned in different embodiments.

Meanwhile, a cell region, to which the base station provides a service, may be divided into a plurality of smaller regions in order to improve system performance. Each smaller region may be referred to as a sector or a segment. A Cell Identity (CellI_ID or IDCell) is given based on the entire system, whereas a sector or segment identity is given based on a cell region, to which the base station provides a service. Generally, user equipments may be distributed in a wireless communication system in a state in which the user equipments are fixed or movable. Each user equipment may communicate with one or more base stations through an Uplink (UL) and a Downlink (DL) at an arbitrary moment.

FIG. 3 shows a CAS structure using the conventional multi antennas in which the CAS includes a DAS so that a base station and user equipments uses the DAS. The positions of CAs and DAs are shown as being divided from each other for simplicity of description. However, the positions of CAs and DAs are not limited to the example illustrated in FIG. 3. The CAs and DAs may be variously positioned in different embodiments.

As shown in FIGS. 1 to 3, an antenna or an antenna node supporting each user equipment may be defined. Particularly upon transmitting downlink data, different data for each antenna or each antenna node may be transmitted for different user equipments through the same time and frequency resources. This is a kind of MU-MIMO operation to transmit different data streams for each antenna or each antenna node through selection of the antennas or the antenna nodes.

In the present invention, each antenna or each antenna node may be an antenna port. The antenna port is a logical antenna implemented by a physical transmit antenna or a combination of a plurality of physical transmit antenna elements. Also, in the present invention, each antenna or each antenna node may be a virtual antenna. A signal transmitted by a beam precoded using a beam forming method may be recognized as being transmitted by an antenna. Such an antenna transmitting the precoded beam is referred to as a virtual antenna. Also, in the present invention, antennas or antenna nodes may be divided according to a reference signal (pilot). One or more antennas or antenna groups transmitting the same reference signal or the same pilot mean a set of one or more antennas transmitting the same reference signal or the same pilot. That is, each antenna or antenna mode of the present invention may be interpreted as a physical antenna, a set of physical antennas, an antenna port, a virtual antenna, or an antenna identified by a reference signal or pilot. In embodiments of the present invention, which will hereinafter be described, an antenna or an antenna node may be one selected from among a physical antenna, a set of physical antennas, an antenna port, a virtual antenna, and an antenna identified by a reference signal or pilot. Hereinafter, a physical antenna, a set of physical antennas, an antenna port, a virtual antenna, and an antenna identified by a reference signal or pilot will generally be referred to as an antenna or an antenna node.

Figure 4:
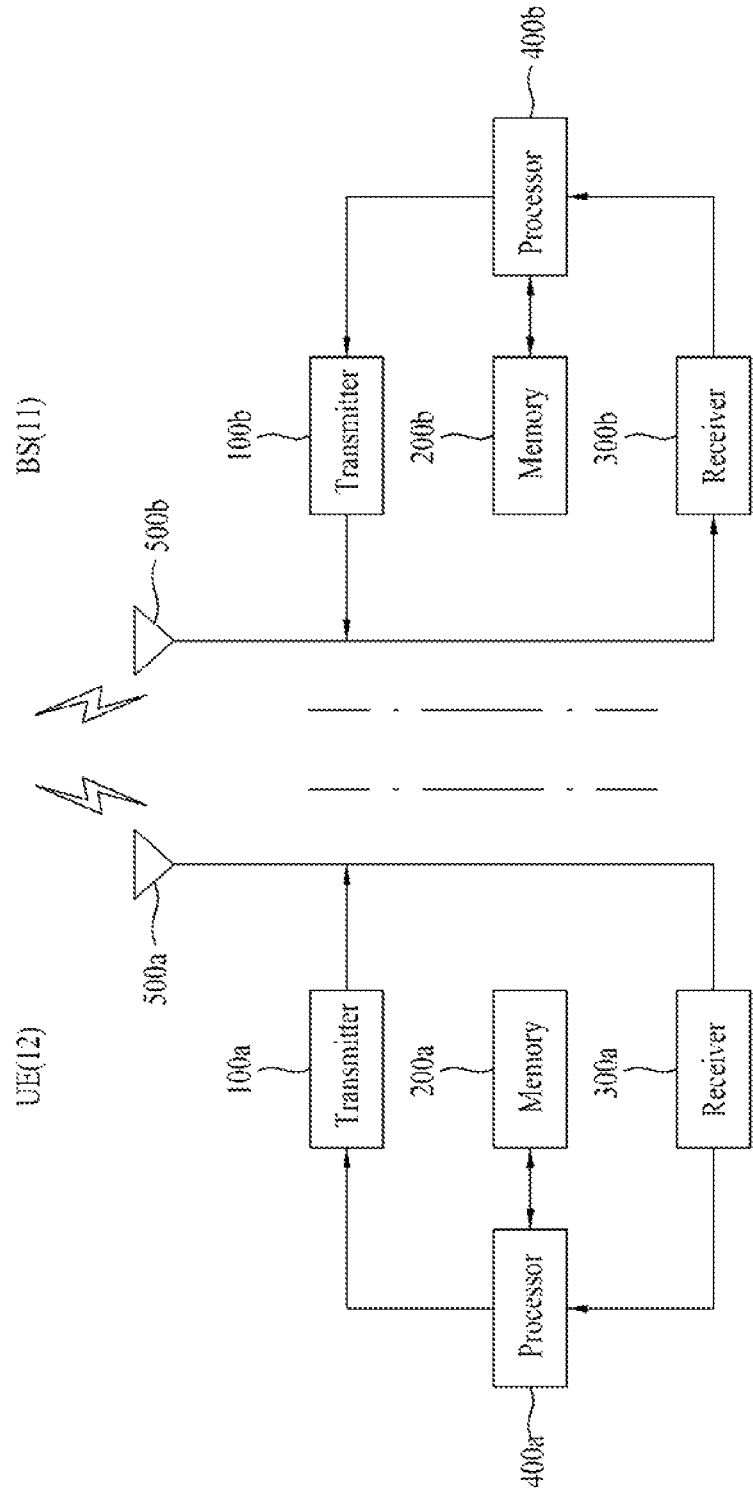
FIG. 4 is a block diagram showing components of a user equipment and a base station which implement the present invention.

FIG. 4 is a block diagram showing components of a user equipment and a base station which implement the present invention.

A user equipment (UE) 12 serves as a transmitting device on an uplink and as a receiving device on a downlink. On the other hand, a base station (BS) 11 may serve as a receiving device on the uplink and as a transmitting device on the downlink.

The user equipment 12 and the base station 11 include antennas 500a and 500b to receive information and/or data, signals, and messages, transmitters 100a and 100b to transmit messages by controlling the antennas 500a and 500b, receivers 300a and 300b to receive messages by controlling the antennas 500a and 500b, and memories 200a and 200b to store various kinds of information associated with communication in a wireless communication system, respectively. Also, the user equipment 12 and the base station 11 further include processors 400a and 400b, respectively, which are configured to implement the present invention by controlling the components of the user equipment 12 and the base station 11, such as the transmitters, the receivers, and the memories. The transmitters 100a and 100b, the memories 200a and 200b, the receivers 300a and 300b, the processors 400a and 400b, and the antennas 500a and 500b in the user equipment 12 and the base station may cooperated with each other. The transmitter 100a, the receiver 300a, the memory 200a, and the processor 400a in the user equipment 12 may be configured as independent components on separate chips or their separate chips may be incorporated into a single chip. In the same manner, the transmitter 100b, the receiver 300b, the memory 200b, and the processor 400b in the base station 11 may be configured as independent components on separate chips or their separate chips may be incorporated into a single chip. A transmitter and a receiver may be configured as a single transceiver in the user equipment or the base station. The antennas 500a and 500b serve to transmit signals generated from the transmitters 100a and 100b to the outside, or to transfer radio signals received from the outside to the receivers 300a and 300b. A transceiver module supporting a Multiple Input Multiple Output (MIMO) function to transmit and receive data using a plurality of antennas may be connected to two or more antennas.

The processors 400a and 400b generally control overall operations of various modules of the user equipment 12 and the base station 11. Especially, the processors 400a and 400b may carry out various control functions to implement the present invention, a Medium Access Control (MAC) frame variable control function based on service characteristics and a propagation environment, a power saving mode function to control idle-mode operations, a handover function, and an authentication and encryption function. The processors 400a and 400b may also be referred to as controllers, microcontrollers, microprocessors, microcomputers, etc. Meanwhile, the processors 400a and 400b may be configured as hardware, firmware, software, or a combination thereof. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), or Field Programmable Gate Arrays (FPGAs), which is configured to implement the present invention. On the other hand, in a firmware or software configuration, firmware or software may be configured to include a module, a procedure, or a function, which performs functions or operations of the present invention. The firmware or software configured to implement the present invention may be provided in the processors 400a and 400b, or may be stored in the memories 200a and 200b so that the firmware or software can be driven by the processors 400a and 400b.

The transmitters 100a and 100b perform predetermined coding and modulation with respect to signals and/or data, which are scheduled by the processors 400a and 400b or schedulers connected to the processors 400a and 400b and transmitted to the outside, and then transfer the modulated signals and/or data to the antennas 500a and 500b. For example, the transmitters 100a and 100b convert a transmission data stream into K signal trains by demultiplexing, channel coding, modulation, etc. The K signal trains are transmitted through the antennas 500a and 500b after being processed in transmission processors of the transmitters. The transmitters 100a and 100b and the receivers 300a and 300b of the user equipment 12 and the base station 11 may be configured in different manners depending on procedures of processing transmitted signals and received signals.

Figure 5:
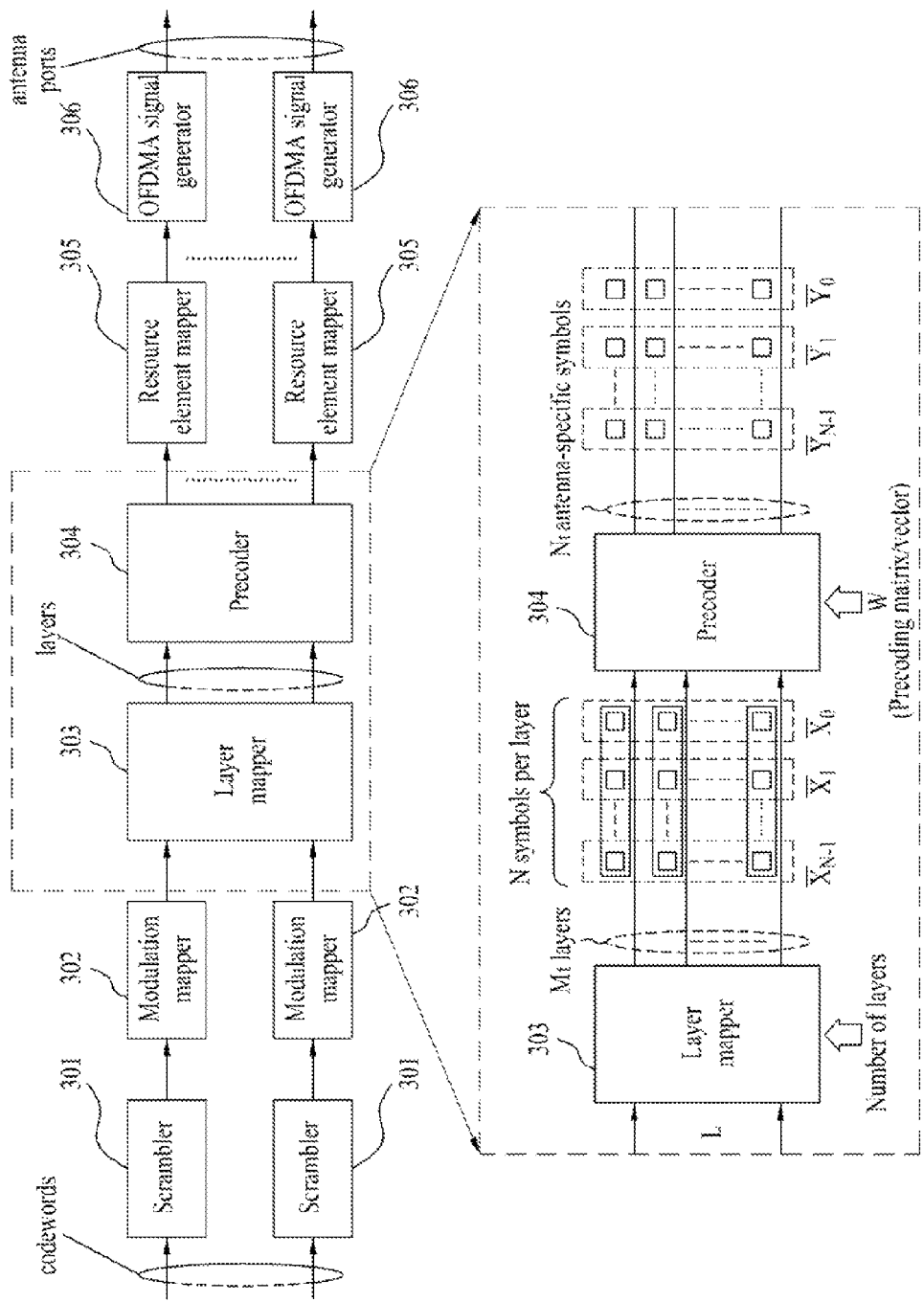
FIG. 5 is a view showing an Orthogonal Frequency Division Multiple Access (OFDMA) type signal processing procedure.

FIG. 5 is a view showing an Orthogonal Frequency Division Multiple Access (OFDMA) type signal processing procedure.

A transmitter in a user equipment or a base station may transmit one or more codewords. The one or more codewords may be scrambled by scramblers 301 and may be modulated as complex symbols by modulation mappers 302. A layer mapper 303 maps the complex symbols to one or more transmission layers, for example, $M_l$ layers. For example, the layer mapper 303 may map N complex symbols per layer.

According to IEEE 802.16, the layer mapper 303 may be implemented as an MIMO encoder (not shown). The MIMO encoder may encode one or more data trains to be transmitted using a predetermined coding method to form coded data, and may modulate the coded data to arrange the coded data as symbols to express positions on signal constellation. A data train is an information path input to the MIMO encoder. A data train indicates a channel coding block. According to IEEE 802.16, an information path input to the MIMO encoder is referred to as an MIMO layer. Meanwhile, the MIMO encoder may define layers of input symbols so that the precoder 304 can distribute a specific symbol of an antenna to the path of the corresponding antenna. That is, the MIMO encoder maps L MIMO layers into $M_t$ MIMO streams. The MIMO encoder is a batch processor to simultaneously process M input symbols. The M input symbols may be expressed as an Mx1 vector as follows.

$$s = \begin{bmatrix} s_1 \\ s_2 \\ \ldots \\ s_M \end{bmatrix} \quad \text{Equation 1}$$

Where, Si indicates an n-th input symbol of a batch. One or more succesive symbols may belong to an MIMO layer. A procedure of mapping the input symbols from MIMO layers to MIMO streams is first performed in a spatial dimension. Output of the MIMO encoder, which serves as an input of the precoder 304, may be expressed as an $M_t \times N_F$ MIMO STC matrix as follows.

$$x = S(s) \quad \text{Equation 2}$$

Where, $M_t$ indicates the number of MIMO streams, $N_F$ indicates the number of subcarriers occupied by an MIMO block, x indicaes an output of the MIMO encoder, s indicates an input MIMO layer vector, s( ) indicates a function to map the input MIMO layer vector to an STC matrix, and S(s) indicates an STC matrix.

The STC matrix x may be expressed as follows.

$$x = \begin{bmatrix} x_{1,1} & x_{1,2} & \ldots & x_{1,N_F} \\ x_{2,1} & x_{2,2} & \ldots & x_{2,N_F} \\ \ldots & \ldots & \ldots & \ldots \\ x_{M_t,1} & x_{M_t,2} & \ldots & x_{M_t,N_F} \end{bmatrix} \quad \text{Equation 3}$$

The MIMO encoder may use various coding methods, such as SFBC, vertical encoding, multi-layer encoding, and CDR.

SFBC Encoding

In SFBC encoding, an input to the MIMO encoder may be expressed as a 2×1 vector.

$$s = \begin{bmatrix} s_1 \\ s_2 \end{bmatrix} \quad \text{Equation 4}$$

In a case in which encoding is performed using an SFBC encoding method, the MIMO encoder generates an SFBC matrix, which is a 2×2 matrix, as follows.

$$x = \begin{bmatrix} s_1 & -s_2^* \\ s_2 & s_1^* \end{bmatrix} \quad \text{Equation 5}$$

The SFBC matrix occupies two successive subcarriers.

Vertical Encoding

In SFBC encoding, an input and output of the MIMO encoder may be expressed as an Mx1 vector as follows.

$$x = s = \begin{bmatrix} s_1 \\ s_2 \\ \ldots \\ s_M \end{bmatrix} \quad \text{Equation 6}$$

Where, $s_i$ indicates an i-th input symbol in a batch. In the vertical encoding, $s_1 \ldots s_M$ belong to the same MIMO layer.

Multi-Layer Encoding

In the case of multi-layer encoding, an input and output of the MIMO encoder may be expressed as an Mx1 vector as follows.

$$x = s = \begin{bmatrix} s_1 \\ s_2 \\ \ldots \\ s_M \end{bmatrix} \quad \text{Equation 7}$$

Where, $s_i$ indicates an i-th input symbol in a batch. In the multi-layer encoding, $s_1 \ldots s_M$ belong to different MIMO layers. One or more successive symbols may belong to the same MIMO layer.

Conjugate Data Repetition (CDR) Encoding

In the case of CDR encoding, an input to the MIMO encoder may be expressed as a 1×1 vector as follows.

$$s = s_t \quad \text{Equation 8}$$

In a case in which encoding is performed using an CDR encoding method, the MIMO encoder generates a CDR matrix, which occupies two successive subcarriers, as follows.

$$x = [s_1 s_1^*] \quad \text{Equation 9}$$

The precoder 304 multiplies complex symbols of a transmission layer by a predetermined precoding matrix selected according to channel status, for example, a $N_t \times M_t$ precoder matrix W, and outputs the multiplication result as complex symbols for $N_t$ antennas. The output of the precoder 304 may be expressed as a $N_t \times N_F$ matrix as follows.

$$z = Wx = \begin{bmatrix} z_{1,1} & z_{1,2} & \ldots & x_{1,N_F} \\ z_{2,1} & x_{2,2} & \ldots & x_{2,N_F} \\ \ldots & \ldots & \ldots & \ldots \\ z_{N_t,1} & x_{N_t,2} & \ldots & x_{N_t,N_F} \end{bmatrix} \quad \text{Equation 10}$$

Where, $N_t$ indicates the number of transmit antennas, and $Z_{j,k}$ indicates an output symbol to be transmitted on a k-th subcarrier through a j-th antenna.

The precoder 304 may use both a codebook method and a non-codebook method. The complex symbols for each antenna are mapped to time-frequency resource elements used in transmission by resource element mappers 305. The complex symbols for each antenna mapped to time-frequency resource elements are modulated by the OFDMA signal generator 306 using an OFDMA method and are transmitted to the respective antenna or the respective antenna ports in the form of OFDMA symbols (also referred to as OFDM symbols) for each antenna or each antenna port. The OFDMA signal generator may perform Inverse Fast Fourier Transform (IFFT) with respect to the input symbols. A cyclic prefix (CP) may be inserted into time domain symbols upon which IFFT has been performed. The OFDMA symbols are transmitted through the respective antennas.

In 3×PP LTE and IEEE 802.16, similar terms may designate different objects. Hereinafter, an information path input to the layer mapper 303 will be referred to as an MIMO layer, and an information path output from the layer mapper 303 will be referred to as a data stream, in order to prevent confusion and for the convenience of description.

Although, in FIG. 5, the signal processing procedure using the Orthogonal Frequency Division Multiple Access (OFDMA) method is described as an example, a user equipment may process an uplink signal using a Single Carrier Frequency Division Multiple Access (SC-FDMA) method and may transmit the processed uplink signal to a base station. AN SC-FDMA type transmitter may include a scrambler 301, a modulation mapper 302, a precoder 304, and a resource element mapper 305. The scrambler 301 of the user equipment scrambles a transmission signal using a specific scrambling signal of the user equipment. The modulation mapper 302 modulates the scrambled signal into a complex symbol using BPSK, QPSK, or 16 QAM according to the kind of the transmission signal and/or channel status. The modulated complex symbol is precoded by the precoder 304, and is mapped to a time-frequency resource element to be used in real transmission by the resource element mapper 305. The signal mapped to the resource element may be transmitted to the base station through the antenna in the form of an SC-FDMA signal. The user equipment adopting the SC-FDMA signal processing method may include an SC-FDMA signal generator to convert the signal mapped to the resource element into an SC-FDMA signal.

Although the OFDMA method is mainly used for downlink transmission since it is possible to increase frequency efficiency and cell capacity, the OFDMA method may also be used for uplink transmission. The user equipment may be configured to adopt both the OFDMA method and the SC-FDMA signal processing method. Also, the user equipment may be designed so that the both methods can be switched according to a channel environment.

Although, in FIG. 5, the scramblers 301, the modulation mappers 302, the layer mapper 303, the precoder 304, the resource element members 305, the OFDM signal generators 306 are described as being included in the transmitters 100a and 100b, the processors 400a and 400b may be designed to include the above operational modules. The transmitters 100a and 100b may modulate OFDMA symbol signals into radio frequency (RF) signals and may transmit the modulated signals to the antennas 500a and 500b. The antennas 500a and 500b of the receiving device may receive the RF signals and may transmit the received RF signals to the receivers 300a and 300b. The receivers 300a and 300b may modulate the RF signals into OFDMA symbol signals and may provide the modulated signals to the processors 400a and 400b.

Control Channel Allocation for Each Antenna or Antenna Node

In a communication standard, given time, space, and frequency resources are divided into various regions according to uses to prescribe information and characteristics of signals to be transmitted on the regions. Information which a base station transmits to a user equipment through a downlink may be divided into information for all equipment within coverage of the base station and information for a specific user equipment(s).

For example, system parameters, such as a cell ID or the number of antennas of the base station, may be information for all use equipments. On the other hand, control information, such as uplink power control information, response information for Hybrid Automatic Repeat reQuest (HARQ) ACKnowledge/Negative-ACKnowledge (ACK/NACK), or data information requested by a user equipment may be information for a specific user equipment.

Generally, information for all user equipments is present at a predetermined position of a specific channel so that all user equipments can access the information. For example, Physical Broadcast Channel (PBCH) and Physical Control Format Indicator Channel (PCFICH) of 3GPP LTE/LTE-A and Frame Control Header (FCH) or SuperFrame Header (SFH) of IEEE 802.16 e/m are channels, through which information for all user equipments is transmitted. The information is transmitted using designated time and frequency resources.

On the other hand, information for a specific user equipment or user equipment group is transmitted using different time and frequency resources except when an MU-MIMO method is used. In order for a user equipment to access information for the user equipment, therefore, map information indicating to which resource region the information has been allocated is necessary. On a downlink, such map information is transmitted through a DL/UL MAP and/or an Advanced-MAP (A-MAP) in IEEE 802.16e/m and through a Physical Downlink Control Channel (PDCCH) in 3GPP LTE/LTE-A. Hereinafter, a wireless resource, through which such map information is transmitted, will be referred to as a "control channel", and a wireless resource region having a predetermined range, to which one or more control channels can be allocated, will be referred to as a "control region". For example, a PDCCH or an A-MAP may be referred to as a control channel, and a predetermined time and/or frequency resource region, to which a PDCCH or an A-MAP can be allocated, may be referred to as a control region. In particular, a resource region, on which a PDCCH or an A-MAP can be allocated or transmitted, will hereinafter be referred to as a PDCCH/A-MAP region.

Information necessary to receive or detect data for a user equipment(s), such as Modulation and Coding Scheme (MCS) level information, is transmitted together with resource allocation information through the control channel. Also, control information for each user equipment, such as power control information, may also be transmitted.

Figure 6:
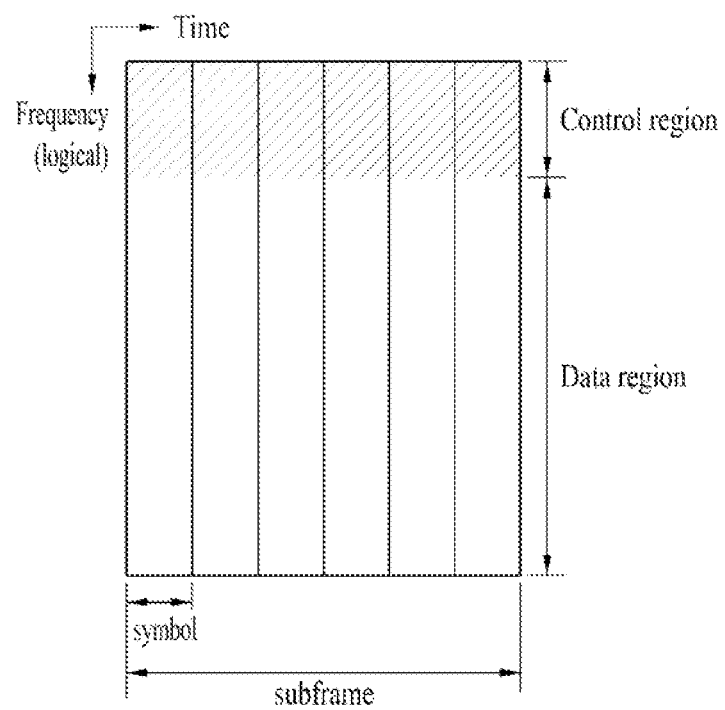
FIG. 6 is a view showing an example of a control region to which an A-MAP can be transmitted in IEEE 802.16m.
Figure 7:
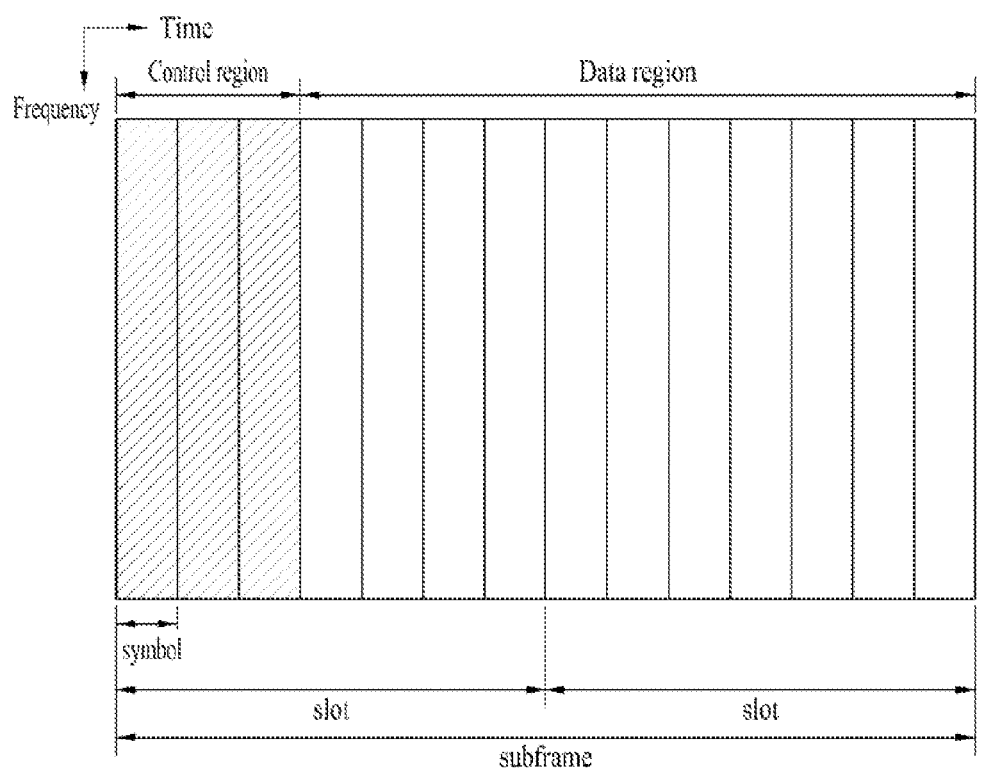
FIG. 7 is a view showing an example of a control region to which a PDCCH can be transmitted in 3GPP LTE/LTE-A.

FIG. 6 is a view showing an example of a control region on which an A-MAP can be transmitted in IEEE 802.16m, and FIG. 7 is a view showing an example of a control region on which a PDCCH can be transmitted in 3GPP LTE/LTE-A.

Referring to FIG. 6, a radio frame structure used in IEEE 802.16 may include a 20 ms superframe supporting a bandwidth of 5 MHz, 8.75 MHz, 10 MHz, or 20 MHz. The superframe may include four 5 ms frames F0 to F3 of the same size, and begins with a SuperFrame Header (SFH). The SuperFrame Header carries an essential system parameter and system configuration information. The SuperFrame Header may be located at a first subframe in the superframe. A frame may include 8 subframes SF0 to SF7. Subframes are allocated to downlink or uplink transmission. Each subframe includes a plurality of OFDMA symbols in a time domain and a plurality of resource units (RUs) in a frequency domain. Each RU includes a plurality of subcarriers in the frequency domain. The OFDMA symbols may be referred to as OFDMA symbols or SC-FDMA symbols according to multi access methods. The number of OFDMA symbols included in each subframe may be variously changed according to the bandwidth of a channel and the length of a Cyclic Prefix (CP). The type of a subframe may be defined based on the number of OFDMA symbols included in the subframe. For example, type-1 subframe may be defined as including 6 OFDMA symbols, type-2 subframe may be defined as including 7 OFDMA symbols, type-3 subframe may be defined as including 5 OFDMA symbols, and type-4 subframe may be defined as including 9 OFDMA symbols. A subframe may include the same type of subframes or different types of subframes. FIG. 6 illustrates type-1 subframe in which a subframe includes 6 OFDMA symbols for the convenience of description. However, embodiments of the present invention, which will hereinafter be described, may also be applied to different types of subframes in the same manner. For reference, in IEEE 802.16, a resource including an OFDMA symbol and a subcarrier is also referred to as a tone.

An A-MAP of IEEE 802.16m is transmitted per downlink subframe. In a case in which flexible/fractional frequency reuse (FFR) is applied to a downlink subframe, a reuse-1 partition and/or a power-boosted reuse-3 partition may include an A-MAP region. Although not shown, an uplink control channel carrying uplink control information in an uplink subframe is also located at the reuse-1 partition or the power-boosted reuse-3 partition.

For reference, FFR is a technology that is capable of differently setting a frequency reuse factor to be applied to different frequency partitions. In OFDMA, a system band is divided on a per subcarrier basis. Consequently, a signal is transmitted on each subcarrier, and all subcarriers are necessarily used in signal transmission. It is possible to simultaneously increase throughput of users at the center of a cell and users at the border of the cell (edge of the cell) using such characteristics. Specifically, a central region of the cell is adjacent to the base station, and therefore, the central region of the cell is safe from co-channel interference from a neighboring cell. Consequently, the users at the center of the cell can use all possible subcarriers. On the other hand, the users at the border of the cell can only some of all possible subcarriers. At the borders of the neighboring cells, frequencies are allocated to the cells so that the respective cells can use different subcarriers. This is referred to as flexible/fractional frequency reuse (FFR). In IEEE 802.16m, the system band may be divided into a maximum of 4 frequency partitions. Power may be differently allocated to the respective frequency partitions to boost power of a specific frequency partition. Each frequency partition is divided into one or more resource units (RUs). The frequency partitions are indexed from a lower logical resource unit (LRU) index to a higher LRU index. At this time, a frequency partition including the lowest LRU index may be a reuse-1 partition, which is followed by three reuse-3 partitions or two reuse-2 partitions. A power-boosted reuse-3 partition is one of the reuse-3 partitions to which high power is allocated.

Referring to FIG. 7, a radio frame structure used in 3GPP LTE/LTE-A has a length of 10 ms (327200 Ts) and includes 10 subframes of a uniform size. Each of the subframes has a length of 1 ms and includes two slots. Each slot has a length of 0.5 ms. Here, Ts indicates sampling time, and Ts is expressed as Ts=1/(2048×15 kHz). Each slot includes a plurality of OFDMA symbols in a time domain and a plurality of resource blocks in a frequency domain. Each resource block includes a plurality of subcarriers in the frequency domain. The OFDMA symbols may be referred to as OFDMA symbols or SC-FDMA symbols according to multi access methods. The number of OFDMA symbols included in a slot may be variously changed according to the bandwidth of a channel and the length of a CP. For example, in the case of a normal CP, a slot includes 7 OFDMA symbols. On the other hand, in the case of an extended CP, a slot includes 6 OFDMA symbols. FIG. 7 illustrates a subframe in which a slot includes 7 OFDMA symbols for the convenience of description. However, embodiments of the present invention, which will hereinafter be described, may also be applied to different types of subframes in the same manner. For reference, in 3GPP LTE/LTE-A, a resource including an OFDMA symbol and a subcarrier is also referred to as a resource element (RE).

In 3GPP LTE/LTE-A, each subframe includes a control region and a data region. The control region includes one or more OFDMA symbols starting from a first OFDMA symbol. The size of the control region may be independently set for each subframe. For reference, a PCFICH and a Physical Hybrid automatic retransmit request Indicator CHannel (PHICH) as well as a PDCCH may be allocated to the control region As shown in FIGS. 6 and 7, control information is transmitted to a user equipment using predetermined time and frequency resources, which are parts of the wireless resources. Control information regarding a user equipment(s), including map information, is transmitted through the control channel. Each user equipment detects and receives a control channel thereof from among control channels transmitted by the base station. As the number of user equipments in a cell is increased, relative importance of resources occupied by such a control channel is increased. With population of machine to machine (M2M) communication and a DAS in future, the number of user equipments in the cell will be much more increased. As a result, a control channel supporting such user equipments will be enlarged. That is, the number of OFDMA symbols occupied by a control channel in a subframe and/or the number of subcarriers occupied by a control channel in a subframe will be inevitably increased. Consequently, the present invention provides methods of efficiently utilizing a control channel using the characteristics of a DAS.

According to the current communication standard based on a CAS, all antennas belonging to a base station transmit control channels (for example, a MAP, an A-MAP, a PDCCH, etc.) regarding all user equipments in the base station on a control region. In order to obtain information regarding an antenna node allocated to each user equipment and control information, such as downlink/uplink resource allocation information, each user equipment must process the control region, which is a common region defined for control information transmission, to obtain control information thereof. For example, each user equipment may obtain control information thereof, which is one of the signals transmitted through the control region, using a blind decoding method.

If each antenna transmits control information regarding all user equipments on the same control region according to the current communication standard, all of the antennas transmit the same signal on the control region, and therefore, implementation is easily achieved. However, if the size of control information to be transmitted is increased due to the increase in number of user equipments covered by the base station, an MU-MIMO operation, and additional control information (for example, information regarding antenna nodes allocated to the user equipments) for a DAS, the size or number of control channels is increased with the result that it may be difficult to transmit all control information through the conventional control region.

In order to efficiently use the control channel, the present invention proposes a method of differently setting a user equipment(s), which is an object of control information transmission, for each antenna or antenna node. In this case, the user equipment may receive control information from an antenna node or from a plurality of antenna nodes. According to the present invention, control information to be transmitted on a specific control region may be different for each antenna or antenna node in the DAS. That is, in the present invention, user equipment groups are divided per antenna or antenna node, and each antenna or antenna node transmits control information regarding a corresponding user equipment group. Control information regarding a plurality of user equipments may be multiplexed to a control channel and may then be transmitted. Alternatively, a control channel may be configured with respect to each user equipment, and a plurality of control channels may be multiplexed to a control region and may then be transmitted.

In terms of a user equipment, user equipment groups to which control information is to be transmitted for each base station antenna group may be different from each other, and therefore, control information received by the respective user equipments on the control region may different from each other. Also, antenna groups which receive control information from the respective user equipments may be different from each other. This is because user equipments multiplexed to a predetermined control channel or a predetermined control region are different from each other.

Each user equipment may belong to one or more user equipment groups. A user equipment group may be included in another user equipment group. User equipment groups including different user equipments may be regarded as different user equipment groups even if the user equipment groups share some user equipments. In a case in which the number of user equipments belonging to the respective user equipment groups and the respective user equipments are the same, however, the user equipments are regarded as belonging to a user equipment group. In a case in which a user equipment belongs to a plurality of user equipment groups, the user equipment may receive different control information or control channel sets on the control region from a corresponding antenna group transmitting signals to the plurality of user equipment groups.

The processor 400b of the base station according to the present invention may group user equipments within coverage of the base station into user equipment groups, to which control information is transmitted. The processor 400b may distribute the user equipments for each antenna or antenna node. Also, control information of user equipments allocated to the same antenna or antenna node of the base station, i.e. control information of user equipments belonging to the same user equipment group, may be multiplexed to a predetermined control channel or control region. Under control of the processor 400b, the precoder 100b of the base station may map control information of a user equipment(s) belonging to the same user equipment group to the same antenna or antenna node. Since a user equipment may belong to one or more user equipment groups, a user equipment belonging to a plurality of user equipment groups may be mapped to a plurality of antenna nodes.

A control information transmission method of the present invention includes an embodiment in which an antenna node set through which a base station transmits control information to a user equipment and an antenna node set through which the base station transmits data to the user equipment are differently configured. Consequently, the base station processor 400b can control the precoder 100b to map data to an antenna node different from an antenna node through which control information is transmitted. Also, the control information transmission method of the present invention includes an embodiment in which an antenna node set through which a base station receives control information from a user equipment and an antenna node set through which the base station receives data from the user equipment are differently configured.

Figure 8:
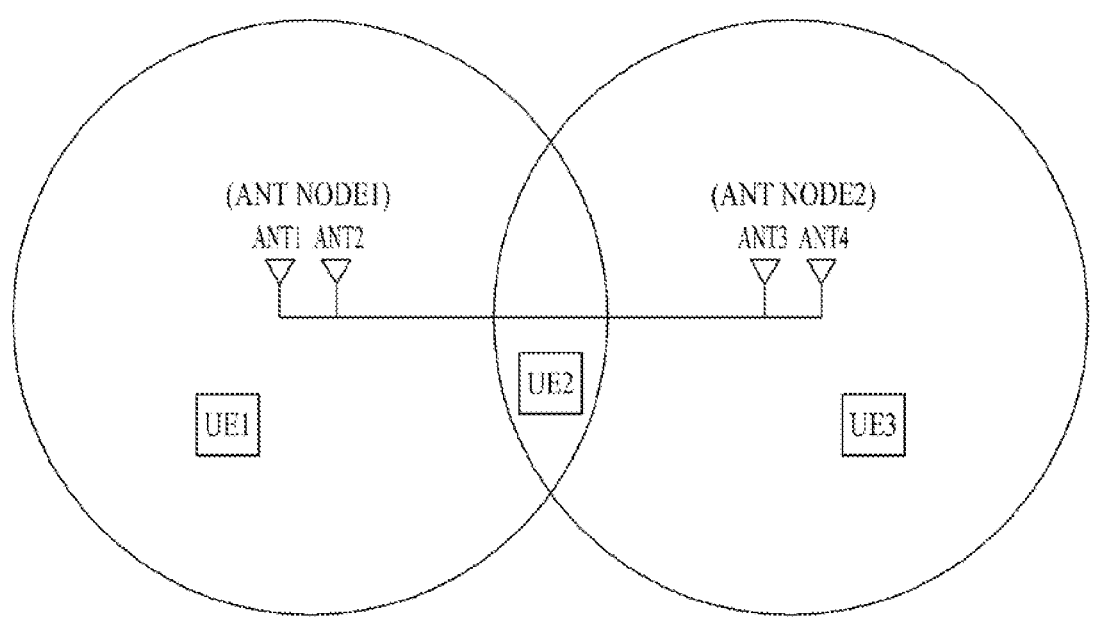
FIGS. 8 and 9 are views illustrating transmission of control information in a DAS according to the present invention.
Figure 9:
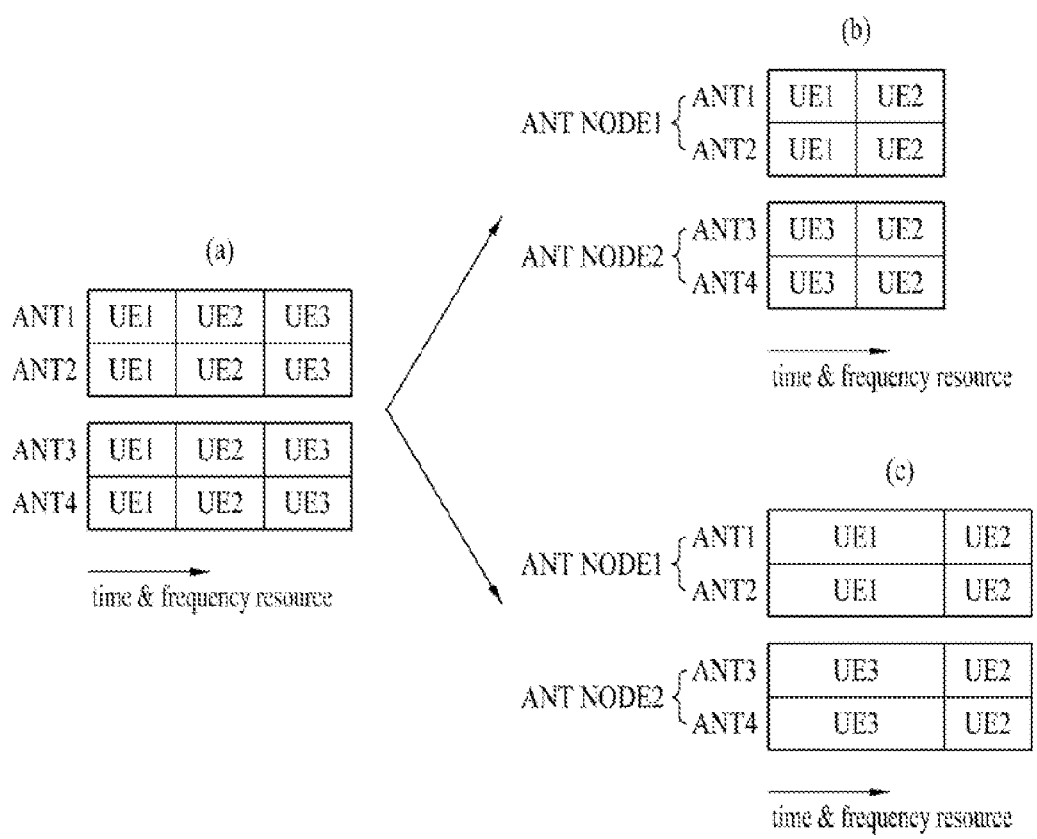

FIGS. 8 and 9 are views illustrating transmission of control information in a DAS according to the present invention.

Referring to FIG. 8, a DAS system of FIG. 8 includes antenna node 1 consisting of ANT1 and ANT2 and antenna node 2 consisting of ANT3 and ANT4. On the assumption that UE2 is within coverage of antenna node 1 and coverage of antenna node 2, UE1 is within coverage of antenna node 1, and UE3 is within coverage of antenna node 2, a base station of FIG. 8 may transmit control information according to (a), (b), or (c) of FIG. 9.

Referring to FIG. 9(a), all antennas of the base station transmit control information for UE1, UE2, and UE3 in the same time and frequency regions. That is, each antenna of the base station transmits control information of UE1, UE2, and UE3 at a predetermined time using a predetermined frequency.

In embodiments of the present invention, user equipments supported in a control region for each antenna node are differently set to improve efficiency of a control channel. Referring to FIGS. 9(b) and 9(c), according to the present invention, antenna node 1 transmits control information of UE1 and UE2 on predetermined time and frequency resources, and antenna node 2 transmits control information of UE2 and UE3 on the predetermined time and frequency resources. Control information for UE2 affected by all antenna nodes of FIG. 8 is transmitted from antenna node 1 and antenna node 2 using predetermined resources. Control information for UE1 affected by antenna node 1 consisting of ANT1 and ANT2 is transmitted from antenna node 1 using the same resources as the predetermined resources. Control information for UE3 affected by antenna node 2 consisting of ANT3 and ANT4 is transmitted from antenna node 3 using the same resources as the predetermined resources.

According to the present invention, as shown in FIG. 9(b), it is possible to reduce resources to be allocated to the control channel or to support more user equipments using predetermined resources allocated to the control channel. Otherwise, as shown in FIG. 9(c), it is possible to transmit control information while increasing the amount of the control information using predetermined resources allocated to the control channel. According to the present invention, therefore, it is possible to improve efficiency of control information transmission through the control region by differently setting a user equipment(s) allocated to the control region for each antenna node.

A plurality of antenna nodes may transmit control information using the same resource to a user equipment moving at high speed, a legacy user equipment to which the present invention cannot be applied, or a user equipment the location of which is not clear as well as to a user equipment, such as UE2, within coverage of several antenna nodes. Consequently, the base station processor 400b according to the present invention may control the transmitter 100b to map control information regarding a legacy user equipment, a user equipment moving at high speed, or a user equipment the location of which is not clear to a plurality of antenna nodes.

For reference, FIG. 9 illustrates a case in which all antennas belonging to a specific antenna node transmit control information on the same resource as an example. In a case in which all antennas belonging to a specific antenna node transmit the same control information on the same resource, it is possible to improve reliability of control information transmission. Alternatively, some of the antennas belong to the specific antenna node may transmit control information on the same resource, and the remaining antennas may transmit other data, thereby obtaining space multiplexing gain.

In allocating an antenna or antenna node for control information transmission as described above, a user equipment may feed a preferred antenna or antenna node back to a base station in order to transmit control information thereof. The base station may select an antenna or antenna node, through which control information is to be transmitted to the user equipment, with reference to the information fed back by the user equipment.

The user equipment may selectively uses a reference signal from the antenna or antenna node allocated thereto for transmission of control information to selectively receive a data stream containing control information thereof. Alternatively, the user equipment may receive a plurality of data streams and may detect a data stream containing control information thereof from among the received data streams.

Figure 10:
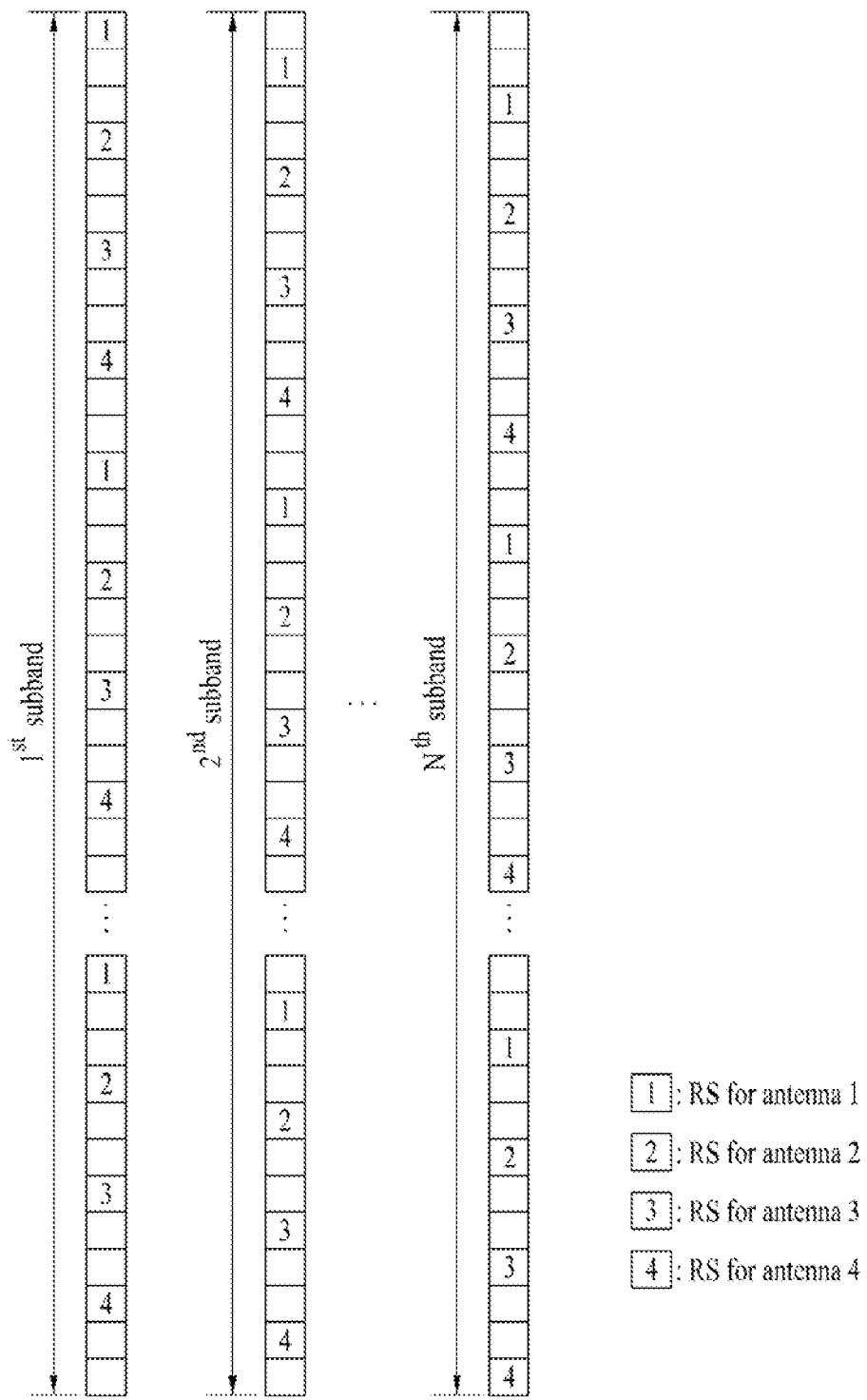
FIG. 10 is a view showing an example of a reference signal used in IEEE 802.16m.

FIG. 10 is a view showing an example of a reference signal used in IEEE 802.16m, and FIG. 11 is a view showing an example of a reference signal used in 3GPP LTE/LTE-A.

Referring to FIGS. 8 and 9, for example, it is assumed that ANT1 transmits a reference signal RS for antenna 1, ANT2 transmits a RS for antenna 2, ANT3 transmits a RS for antenna 3, and ANT4 transmits a RS for antenna 4. Although FIGS. 10 and 11 show reference signals with respect to four transmit antenna to refer to the illustration used in FIGS. 8 and 9, the present invention may be applied to a DAS system including a different number of antennas in the same manner.

Referring to FIG. 10, a different reference signal for each antenna may be transmitted in IEEE 802.16m. Such a reference signal differently defined for each antenna is referred to as a midamble or a MIMO midamble in IEEE 802.16m. The midamble is a signal that can be used by all users in a cell. The midamble may be used to select a Precoding Matrix Indicator/Index (PMI) in the case of closed loop MIMO and to calculate a Channel Quality Indicator/Index (CQI) in the case of open loop MIMO. The midamble is transmitted in a second downlink subframe of each frame. Except a particular case, the midamble occupies a plurality of OFDMA symbols in type-1 or type-2 subframe. Hereinafter, OFDMA symbols occupied by a midamble signal will be referred to as midamble symbols. The processor 400*a* or the receiver 300*a* of the user equipment according to the present invention may include a module to calculate a PMI and/or a module to calculate a CQI using a midamble signal.

FIG. 10 shows an example of the structure of a midamble with respect to a 4Tx antenna. In FIG. 10, a subband is a resource allocation unit including a plurality of, such as four successive, resource units (RUs) in a frequency domain. Each resource unit includes a plurality of subcarriers. A subcarrier to which a midamble signal is allocated is also referred to as a midamble subcarrier. In midamble symbols, a data signal or no signal may be allocated to the other subcarrier, to which no midamble signal is allocated. A subcarrier, to which a data signal is allocated, is also referred to as a data subcarrier, and a subcarrier, to which no signal is allocated and thus which transmits no signal, is also referred to as a null subcarrier.

Each antenna transmits a midamble signal thereof through a corresponding subcarrier. Each antenna does not transmit a signal through subcarriers, through which midamble signals of the other antennas are to be transmitted. For the convenience of description, a midamble signal transmitted by ANTn is referred to as a 'RSn'. Referring to FIGS. 8 and 9, for example, ANT1 transmits RS1, ANT2 transmits RS2, ANT3 transmits RS3, and ANT4 transmits RS4 on a corresponding one of a plurality of subcarriers constituting a first OFDMA symbol in a second subframe of each frame.

UE2 may estimate a PMI from RS1 to RS4 transmitted by ANT1 to ANT4 or may calculate a CQI to receive control information allocated to UE2. UE1 may estimate a PMI from RS1 and RS2 transmitted by ANT1 and ANT2 or may calculate a CQI to receive or detect control information of UE1. That is, each user equipment may receive or detect corresponding control information using only midamble signals from antennas or antenna nodes transmitting control information. To this end, the processor 400*a* of the user equipment may estimate a PMI or calculate a CQI using only a midamble signal from an antenna or antenna node transmitting control information of the user equipment. Under control of the processor 400*a*, the receiver 300*a* of the user equipment may receive or detect control information of the user equipment.

Alternatively, UE1 may also estimate a PMI or calculate a CQI using all of RS1 to RS4. In this case, UE1 may configure a reception filter to minimize channel interference from ANT3 and ANT4 to receive control information of UE1. That is, each user equipment may use midamble signals from all antennas or antenna nodes, and, in this case, the user equipment may recognize channels from antennas or antenna nodes transmitting control information thereof and may configure a reception filter to minimize channel interference from antennas or antenna nodes not transmitting control information thereof to efficiently receive control information thereof. The processor 400*a* of the user equipment may estimate a PMI or calculate a CQI using all midamble signals received by the user equipment. Under control of the processor 400*a*, the receiver 300*a* of the user equipment may configure a reception filter to minimize channel interference from the antenna or antenna node not transmitting control information of the user equipment to receive control information of the user equipment.

Referring to FIG. 11, an RS pattern is defined for each antenna in 3GPP LTE/LTE-A. In 3GPP LTE/LTE-A, such a reference signal differently transmitted for each antenna on a downlink is also referred to as a cell-specific RS (CRS). The CRS enables the user equipment to estimate a channel with respect to a corresponding antenna. The processor 400*a* or the receiver 300*a* of the user equipment may include a channel estimation module to estimate a channel with respect to a corresponding antenna based on the CRS. In the case of a system that is capable of using $N_t$ antennas, the user equipment may estimate independent $N_t$ channels.

FIG. 11 shows an example of a CRS pattern with respect to a 4Tx antenna. The CRS pattern means a pattern of resource elements which a reference signal with respect to a specific antenna occupies in a resource block pair.

Each antenna transmits a CRS thereof on resource elements occupied by the CRS pattern. Each antenna does not transmit a signal on resource elements on which CRSs of the other antennas are to be transmitted. For the convenience of description, a CRS transmitted by ANTn is referred to as a 'RSn'. Referring to FIGS. 8 and 9, for example, ANT1 transmits RS1, ANT2 transmits RS2, ANT3 transmits RS3, and ANT4 transmits RS4 on a corresponding one of a plurality of subcarriers forming a first OFDMA symbol in a second subframe of each frame.

UE2 may measure channel quality from ANT1 to ANT4 based on RS1 to RS4 transmitted by ANT1 to ANT4 to receive control information allocated to UE2. UE1 may measure channel quality based on RS1 and RS2 transmitted by ANT1 and ANT2 to receive control information allocated to UE1. That is, each user equipment may receive corresponding control information using only CRSs from antennas or antenna nodes transmitting control information. The processor 400*a* of the user equipment may control the receiver 300*a* using only a CRS from an antenna or antenna node transmitting control information of the user equipment. Under control of the processor 400*a*, the receiver 300*a* of the user equipment may receive control information of the user equipment or control information regarding a user equipment group to which the user equipment belongs.

Alternatively, UE1 may also measure channel quality using all of RS1 to RS4. In this case, UE1 may configure a reception filter to minimize channel interference from ANT3 and ANT4 to receive control information of UE1. That is, each user equipment may use CRSs from all antennas or antenna nodes, and, in this case, the user equipment may recognize channels from antennas or antenna nodes transmitting control information thereof and may configure a reception filter to minimize channel interference from antennas or antenna nodes not transmitting control information thereof to efficiently receive control information. The processor 400*a* of the user equipment may estimate channel status using the CRSs from antennas or antenna nodes transmitting control information of the user equipment, which is some of the CRSs received by the receiver 300*a*. Also, the processor 400*a* of the user equipment may control the receiver 300*a* to configure a reception filter to minimize channel interference from the antenna or antenna node not transmitting control information of the user equipment using all of the CRSs received by the receiver 300*a*. The receiver 300*a* may receive control information of the user equipment, which is part of various kinds of control information transmitted by the corresponding base station, using the reception filter.

Also, when a user equipment reads control information of the user equipment or a user equipment group to which the user equipment belongs to, may estimate a PMI from a corresponding reference signal, which is one of reference signals transmitted by antennas in a corresponding cell, or calculate/estimate channel quality to decode the corresponding control information. For example, if a PDCCH or an A-MAP is transmitted only through ANT1, the user equipment may estimate a PMI and/or estimate channel quality based on RS1 transmitted by ANT1 to decode the PDCCH or the A-MAP. Alternatively, the user equipment may estimate channels having interference signals from reference signals transmitted by the other antennas so that the estimated channels can be used when decoding the corresponding control information. The processor 400*a* of the user equipment may decode control information of the user equipment using the reference signal transmitted by the antenna used to transmit the control information of the user equipment, which is one of the reference signals received by the receiver 300*a*.

The user equipment processor 400*a* may decode data of the user equipment transmitted on the data region based on the control information of the user equipment.

In a case in which different antennas or antenna nodes transmit control information for different user equipments through the same time and frequency resources as described above, it is possible to improve control channel efficiency.

Antenna/Antenna Node Information

Blind Decoding

The base station may mask control information to be transmitted to each user equipment using an identifier given to each user equipment and may transmit the masked control information (S110). The base station processor 400*b* may generate control information of each user equipment and may mask the control information of each user equipment using an identifier of the corresponding user equipment. A STation IDentifier (STID) and a Radio Network Temporary Identifier (RNTI) may be used for masking. For example, the base station processor 400*b* may mask (for example, XOR operate) a sequence corresponding to an identifier of the corresponding user equipment with respect to a Cyclic Redundancy Check (CRC) for error detection and may add the masked CRC to the generated control information. The base station processor 400*b* channel-codes the control information masked with the identifier of the user equipment (S120) to generate coded data and multiplexes control information of user equipments to be transmitted together at a predetermined antenna or antenna node (S130). The multiplexed control information is transmitted on a predetermined resource region through the predetermined antenna or antenna node via the transmitter 100*b* of the base station, the scrambler 301, the modulation mapper 302, the layer mapper 303, the precoder 304, the resource element mapper, and the OFDMA signal generator 306 (S140 to S190).

The user equipment may configure a plurality of reception filters with respect to a combination of antennas or antenna nodes that can transmit thereto and may find control information thereof through demasking of signals having passed through the reception filters using the respective identifiers thereof. The user equipment may recognize information corresponding to an antenna combination having the highest reception performance as control information thereof. The processor 400*a* of the user equipment may select a candidate group of antennas or antenna nodes that can be allocated to the user equipment. The processor 400*a* of the user equipment may control the receiver 300*a* to configure a reception filter for each combination of antennas or antenna nodes. The processor 400*a* may recognize information corresponding to an antenna combination in which the intensity of a signal having passes through the reception filter is a predetermined level or more as an antenna combination transmitting control information regarding a user equipment group to which the user equipment belongs. The processor 400*a* demasks control information having passed through the reception filter using the identifier of the user equipment to detect a CRC error. The processor 400*a* may recognize control information having no error as control information of the user equipment.

For example, referring to FIGS. 8 and 9, the user equipment may configure reception filters with respect to antenna group 1 including only antenna node 1, antenna group 2 including only antenna node 2, and antenna group 3 including antenna node 1 and antenna node 2, and may recognize an antenna group corresponding to a reception filter having the highest reception performance as an antenna group having transmitted control information of the user equipment. According to the present invention, as previously described with reference to FIG. 3, an antenna group, which is a set of antennas and/or antenna nodes, may be referred to as a DA group. Control information or data of a user equipment(s) belonging to a user equipment group is transmitted by the user equipment group. Referring to FIG. 9(*a*), antenna node 1 and antenna node 2 belonging to antenna group 3 transmit control information of a user equipment group consisting of UE1 to UE3 on a control region. Referring to FIGS. 9(*b*) and 9(*c*), antenna group 1 including antenna node 1 transmits control information of a user equipment group consisting of UE1 and UE2 on a control region, and antenna group 2 including antenna node 2 transmits control information of a user equipment group consisting of UE2 and UE3 on the control region.

Even if a base station does not provide a user equipment with information of an antenna, antenna node, or antenna node group transmitting control information of the user equipment, the user equipment may find a space resource from which control information corresponding thereto is transmitted. Here, the space resource means an antenna or antenna node resource. The user equipment configures a reception filter through all possible combinations of antennas in a situation in which the position and/or number of antennas carrying control information is unknown and demasks a signal having passed through the reception filter using an identifier of the user equipment to acquire information of the user equipment. If a signal for the corresponding user equipment is not present in the detected resource region, demasking using the identifier of the user equipment may not be possible.

Signaling of Antenna/Antenna Node Information

In a case in which the user equipment has a single reception antenna, and therefore, it is difficult to sort signals introduced through the same time and frequency resources through spatial signal processing or in a case in which intensities of signals received by the respective antenna nodes are greatly different from each other, and therefore, it is not difficult for the user equipment to receive control information even if transmit antenna or antenna node information is not known, it may be unnecessary for the user equipment to recognize the antenna or antenna node information.

On the other hand, in a case in which the user equipment has multiple antennas, and therefore, the user equipment selectively receives a data stream corresponding thereto, which is one of a plurality of data steams or in a case in which it is necessary for the user equipment to detect a data stream corresponding thereto from among a plurality of detected data streams, it may be advantageous for the user equipment to recognize information from which antenna or antenna node is information corresponding thereto in improving reception performance of control information.

As previously described with respect to the blind decoding, the user equipment may configure various reception filters based on antenna groups that can be allocated to the user equipment and may recognize antennas or antenna nodes belonging to an antenna group corresponding to a reception filter having the highest reception performance as antennas or antenna nodes having transmitted control information of the user equipment.

Figure 12:
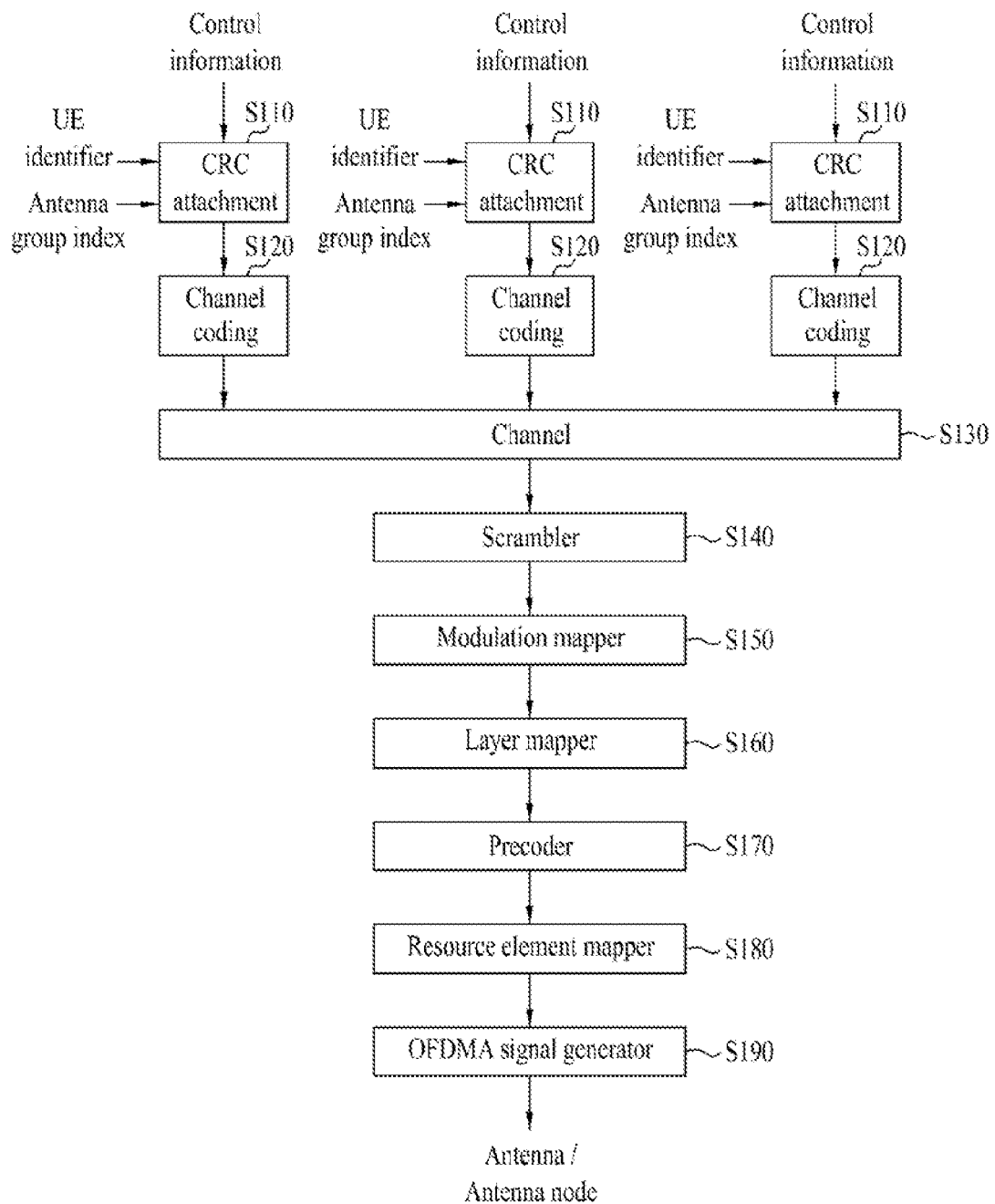
FIG. 12 is a view showing embodiments for signaling antenna information to a user equipment.

However, if information regarding an antenna node transmitting control information of the user equipment is transmitted to the user equipment, it may be possible for the user equipment to stably acquire control information of the user equipment based on more correct information regarding the antenna node. Hereinafter, therefore, embodiments for signaling information (hereinafter, referred to as antenna information) indicating which antenna or antenna node transmits control information to the user equipment, i.e. embodiments for signaling antenna information to the user equipment, will be described with reference to FIG. 12. FIG. 12 is a view showing embodiments for signaling antenna information to a user equipment.

Embodiment 1

Clear Signaling

A base station may transmit information regarding an antenna or antenna node allocated to transmit control information, i.e. antenna information, to a corresponding user equipment(s).

In IEEE 802.16, the antenna information may be clearly signaled to a user equipment, for example, through an SFH, A-MAP IE, preamble, or Medium Access Control (MAC) message. In 3GPP LTE/LTE-A, the antenna information may be clearly signaled to a user equipment, for example, through a PBSH, SIB, or MAC message.

The base station processor 400b may generate at least one selected from among SFH IE containing antenna information regarding a user equipment group, A-MAP IE, preamble sequence, PBCH, SIB, SCH, and MAC messages. Under control of the base station processor 400b, the base station transmitter 100b may transmit the antenna information to a corresponding user equipment.

The antenna information may include an index of an antenna node transmitting control information regarding corresponding user equipment or a pattern index of a downlink reference signal to be received by the corresponding user equipment. The downlink reference signal includes a CRS, a DeModulation Reference Signal (DMRS), a Channel Status Information Reference Signal (CSI-RS), pilot, and midamble. When the base station transmits antenna information for transmission of control information, the user equipment finds and receives control information thereof in the control region using a reference signal corresponding to an antenna node(s) allocated thereto. The user equipment may acquire data thereof, which are parts of data in the data region, based on the control information.

Although, according to embodiment 1, the base station directly transmits information indicating an antenna, antenna node, or antenna group for transmission of control information to the user equipment, signaling may be implicitly performed in an indirect fashion according to embodiment 2 or embodiment 3 in order to reduce signaling overhead.

Embodiment 2

Masking for Each Antenna Group

A base station may transmit control information to each user equipment in a state in which the control information is masked using an identifier or index assigned to each antenna group (S110). The processor 400b of the base station may mask the control information of the user equipment using an identifier or index of an antenna group, to which the control information of the user equipment will be transmitted. For example, the processor 400b may mask (for example, XOR operate) a sequence corresponding to an index of a corresponding antenna group with respect to a 16-bit Cyclic Redundancy Check (CRC) so that the masked CRC can be added to the control information of the user equipment.

The base station processor 400b channel-codes the control information masked with the identifier or index of the antenna group (S120) to generate coded data and multiplexes control information of user equipments to be transmitted together at a predetermined antenna or antenna node (S130). The multiplexed control information is transmitted on a predetermined resource region through the predetermined antenna or antenna node via the transmitter 100b of the base station, the scrambler 301, the modulation mapper 302, the layer mapper 303, the precoder 304, the resource element mapper, and the OFDMA signal generator 306 (S140 to S190).

Referring to FIGS. 8 and 9, it is assumed that an identifier or index is given to antenna group 1 including antenna node 1, antenna group 2 including only antenna node 2, and antenna group 3 including antenna node 1 and antenna node 2. In a case in which ANT to ANT3 transmit the same control information on the same resource as shown in FIG. 9(a), the base station may mask control information regarding UE1, UE2 and UE3 using an identifier or index corresponding to antenna group 3 including antenna node 1 and antenna node 2 and may transmit the masked control information. Referring to FIGS. 9(b) and 9(c), the base station may mask control information regarding UE1 and UE2 using an identifier or index corresponding to antenna group 1 including antenna node 1, may mask control information regarding UE2 and UE3 using an identifier or index corresponding to antenna group 2 including antenna node 2, and may transmit the masked control information to corresponding user equipments.

The user equipment may configure combinations of antennas that can transmit to the user equipment and may find a control channel transmitted to the user equipment through demasking of received control channels using an identifier or index of the corresponding antenna combination or group. The user equipment may recognize that control information of the user equipment is included in the information transmitted through the control channel corresponding to the antenna node group having successfully performed demasking. The processor 400a of the user equipment may configure a candidate group of antenna groups that can be allocated to the user equipment. The processor 400a of the user equipment may demask control information transmitted from the control region using an identifier or index of each antenna group to determine whether a CRC error is detected. The processor 400a may recognize that the antenna group having the identifier or index with no CRC error has transmitted control information of the user equipment and that the antenna group has transmitted control information regarding a user equipment group to which the user equipment belongs.

For example, referring to FIGS. 8 and 9, UE1 may configure antenna group 1, antenna group 2, and antenna group 3 as a combination of antennas that can be allocate thereto, may perform demasking using an identifier or index corresponding to each antenna group, and may recognize effectively demasked control information as control information of a user equipment group to which UE1 belongs.

According to embodiment 2 of the present invention, the user equipment may find a space resource, through which control information corresponding thereto is transmitted. Specifically, according to embodiment 2 of the present invention, the user equipment may configure a reception filter through all possible antenna groups in a situation in which the position and/or number of antenna nodes carrying control information is unknown and may demask a signal having passed through the reception filter using an identifier or index of the antenna group to find an antenna group having transmitted control information of the user equipment. In addition, the user equipment may detect control information to which control information of the user equipment is multiplexed.

Embodiment 3

Scrambling for Each Antenna Node

A base station may divide some or all of information regarding a plurality of user equipments multiplexed to the same resource for each antenna, antenna node, or antenna group, may scramble the user equipment information with a sequence having low correlation, and may transmit the scrambled user equipment information (S130). In this case, the scrambling sequence is a sequence corresponding to an antenna node or antenna group transmitting the information.

The base station processor 400b masks control information of each user equipment using an identifier of the corresponding user equipment (S110), channel-codes the masked control information to generate coded data (S120), and multiplexes control information of user equipments to be transmitted together through a predetermined antenna or antenna node, i.e. the same antenna group (S130).

The base station processor 400b may control the scrambler 301 to scramble control information to be transmitted through the same antenna group with a scrambling sequence corresponding to the antenna group. The scrambled control information is transmitted on a predetermined resource region through the antenna group via the modulation mapper 302, the layer mapper 303, the precoder 304, the resource element mapper, and the OFDMA signal generator 306 (S450 to S190).

The user equipment may descramble the received signals with a scrambling sequence of each antenna group to recognize information having high signal intensity as a control channel through which control information of the user equipment has been transmitted. The processor 400a of the user equipment may configure a candidate group of antenna groups that can be allocated to the user equipment. Under control of the processor 400a of the user equipment, the receiver 300a of the user equipment may perform descrambling with an identifier or index of an antenna group belonging to the candidate group. As a result of descrambling, the processor 400a of the user equipment may recognize that control information of the user equipment is included in control information having more than a predetermined level of signal intensity. In addition, the processor 400a may recognize the antenna group corresponding to the scrambling sequence having more than the predetermined level of signal intensity as a node having transmitted the control information of the user equipment. That is, the user equipment may indirectly acquire antenna information using a scrambling sequence assigned to each antenna group.

In embodiment 3, the user equipment receives a control channel using sequences corresponding to various combinations of all antennas or antenna nodes given in the system in a state in which an antenna, antenna node, or antenna group allocated to the user equipment is not recognized. The user equipment may recognize $N_{upper}$ antenna nodes or antenna groups having relatively high receiving performance as antenna nodes allocated thereto or may decide an arbitrary number of antenna nodes as an antenna node candidate group for the user equipment. An integer $N_{upper}$ may be prescribed as a standard, may be transmitted through a PSCH, SFH, or FCH as a system parameter, or may be transmitted through a PDCCH, a Physical Downlink Shared CHannel (PDSCH), MAP, or A-MAP as control information.

The above-described embodiments 1 to 3 may be applied to an invention related to allocation of control information to an antenna or antenna node previously described with reference to FIGS. 6 to 9. A combination of embodiments 1 to 3 may be applied to the invention. For example, if control information regarding each user equipment group is masked using an identifier of an antenna group allocated to the user equipment group as in embodiment 2, embodiment 3 may further be applied so that the user equipment can more correctly recognize antennas or antenna information.

For reference, the antenna group is a concept including all antenna nodes or all antennas. Consequently, an antenna group may be replaced by an antenna node or an antenna.

Meanwhile, the user equipment may separate control information of the user equipment from control information regarding a user equipment group to which the user equipment belongs. The user equipment may demask control information belonging to the user equipment group using an identifier of the user equipment and, if no CRC error is detected, may detect control information of the user equipment. That is, the processor 400a of the user equipment may demask control information of user equipments belonging to the user equipment group using an identifier of the user equipment and may determine control information from which no CRC error is detected as control information of the user equipment.

Since the base station masks control information of a user equipment using an identifier of the user equipment, the user equipment may decide a candidate group of antenna nodes allocated to the user equipment using an identifier or index of an antenna node or antenna group and may decide the final antenna node using the identifier of the user equipment. Also, the user equipment may receive control information of a user equipment group to which the user equipment belongs using an identifier or index of an antenna node or antenna group and may detect control information of the user equipment from control information of the user equipment group using the identifier of the user equipment.

Alternatively, the user equipment may narrow a candidate group of antenna nodes allocated to the user equipment using an identifier of the user equipment and may make the final decision using an identifier or index of an antenna node or antenna group. Otherwise, the user equipment may recognize an antenna node set having the best reception performance as an antenna node set allocated to the user equipment simultaneously using an identifier of the user equipment and an identifier or index of an antenna node. Control information of the user equipment is masked using an identifier of the user equipment and, in addition, the control information is masked using an identifier or index of an antenna node or antenna group to process the control information once again so that the user equipment can more clearly find a corresponding antenna or antenna node.

The user equipment may use received power information of a reference signal for each reference signal pattern allocated for each antenna or antenna node in order to obtain antenna information.

The user equipment recognizes an antenna node or antenna group allocated thereto using one or more selected from among information received for each antenna node using an index or identifier of an antenna node, information received for each user equipment using an identifier of a user equipment, and reception intensity information of a reference signal, and receives control information transmitted through the corresponding antenna node or antenna group.

Meanwhile, in blind decoding, if a signal for a user equipment is present but a combination of antennas configured by the user equipment is different from a real combination of antennas provided by a base station, the user equipment may obtain a very noisy signal even if the user equipment performs demasking using an identifier of the user equipment. Also, in embodiment 2, if a combination of antennas configured by the user equipment is different from a real combination of antennas provided by a base station, it is not possible to demask a received signal. Also, even in embodiment 3, if a combination of antennas configured by the user equipment is different from a real combination of antennas provided by a base station, a scrambling sequence is changed, and therefore, it is not possible for the user equipment to correctly obtain control information from signals transmitted from the base station.

In order to solve this problem, the base station may signal information regarding a combination of antennas that can be allocated to the user equipment (hereinafter, referred to as antenna combination information) to the user equipment. For example, the base station processor 400b may generate antenna combination information regarding a combination of antennas or antenna nodes that can be allocated to an arbitrary user equipment entering a corresponding cell and may control the transmitter 100b to broadcast the antenna combination information. Upon entering the corresponding cell, the user equipment acquires the antenna combination information to prevent a combination of antennas arbitrarily selected by the user equipment from being different from a combination of antennas that can be actually supported by the base station. Information regarding a combination of antennas that can be provided by the base station may be transmitted to the user equipment through a broadcast signal.

Referring to FIGS. 8 and 9, the base station of FIG. 8 may signal information regarding antenna group 1 including antenna node 1, antenna group 2 including antenna node 2, and antenna group 3 including antenna node 1 and antenna node 2 to user equipments within coverage of the base station as antenna combination information. In performing blind decoding, demasking according to embodiment 2, and descrambling according to embodiment 3, UE1 to UE3 may perform the blind decoding, the demasking, and the descrambling using identifiers or indices of antenna group 1 to antenna group 3 based on the antenna combination information signaled by the base station instead of arbitrarily configuring a candidate group of antenna groups.

When the user equipment is turned on or enters a new cell, the user equipment performs an initial cell detecting operation, such as synchronization with the base station. To this end, the user equipment may receive a synchronization signal from the base station to synchronize with the base station and to acquire information, such as a cell identifier, etc. In IEEE 802.16m, a Primary Advanced preamble (PA-preamble) and a Secondary Advanced preamble (SA-preamble) are used. In 3GPP LTE/LTE-A, a Primary Synchronization Channel (P-SCH) and a Secondary Synchronization Channel (S-SCH) are used as the synchronization signal. In IEEE 802.16m, the PA-preamble is used to obtain a system bandwidth and carrier configuration information, and the SA-preamble is used to obtain a cell identifier. In 3GPP LTE/LTE-A, the P-SCH is used to obtain time or frequency domain synchronization, such as OFDMA symbol synchronization and slot synchronization, and the S-SCH is used to obtain a cell identifier and/or CP configuration information of a cell. For reference, a synchronization signal transmission position in a radio frame is generally fixed. The user equipment synchronized with the base may receive a PBCH, FCH, or SFH from the base station to acquire broadcast information in the cell.

In 3GPP LTE/LTE-A, the PBCH contains a master information block (MIB) including the most frequently transmitted parameters which are necessary for a user equipment to initially access a network of a corresponding base station. The master information block includes parameters, such as a downlink system bandwidth, PHICH configuration, and a system frame number (SFN). The base station according to the present invention may signal antenna combination information to the user equipment, for example, through a PBCH transmitted every frame. The user equipment may receive the PBCH to clearly recognize the antenna combination information as well as the downlink system bandwidth, the PHICH configuration, and the SFN.

In IEEE 802.16e/m, the FCH or the SFH carries an essential system parameter and system configuration information. The user equipment may receive an SFH transmitted every superframe to recognize the essential system parameter and system configuration information. For example, the SFH carries a superframe number, a primary frequency partition position to which an A-MAP region can be allotted, and frequency partition position information for an uplink control channel. The base station according to the present invention may signal antenna combination information to the user equipment, for example, through the SFH.

Meanwhile, in a case in which control information is transmitted for each antenna node, as proposed in the present invention, a user equipment or a user equipment group to which control information is transmitted, a user equipment or a user equipment group to which data is transmitted, and a user equipment or a user equipment group from which uplink information is transmitted may different from each other in terms of the antenna node. For example, referring to FIGS. 8 and 9, UE2 receives control information from both antenna node 1 and antenna node 2 but may receive data from only antenna node 1 or antenna node 2. That is, even in a case in which the DAS base station according to the present invention performs transmission (SU-MIMO transmission) in which multiple antennas perform a transmission for a single user equipment on the same resource when transmitting control information to a specific user equipment, the DAS base station may support different user equipments (MU-MIMO transmission) using the same resource even when transmitting data.

In a case in which an antenna node transmitting control information and an antenna node transmitting data are different from each other, antenna information signaled from the base station to the user equipment may correspond to the antenna node transmitting data or the antenna node transmitting control information. As a result, an antenna node indicated by the antenna information may be different from an antenna node actually transmitting control information or an antenna node actually transmitting data.

In order to overcome disagreement between the antenna node indicated by the antenna information and the antenna node actually transmitting data or control information, the base station according to the present invention may separately inform the respective user equipments of information regarding antenna nodes transmitting control information of the respective user equipment and information regarding antenna nodes transmitting data. Information indicating an antenna transmitting data or control information may be transmitted to the user equipment, for example, in the form of an antenna node index or an antenna group index. Also, for example, in a case in which information regarding an antenna node transmitting control information is signaled to the user equipment by default, information regarding an antenna node transmitting data may be signaled to the user equipment in the form of a difference between an index of the antenna node or antenna group transmitting the control information and an index of the antenna node or antenna group transmitting the data. On the other hand, in a case in which information regarding an antenna node transmitting data is signaled to the user equipment by default, information regarding an antenna node transmitting control information may be signaled to the user equipment in the form of a difference between an index of the antenna node or antenna group transmitting the data and an index of the antenna node or antenna group transmitting the control information.

Information regarding an antenna node transmitting data may be signaled to the user equipment through the control information. For example, the base station processor 400*b* may generate control information including information regarding an antenna node which will support a corresponding user equipment in a data region and may control the base station transmitter 100*b* to allocate or transmit the control information to a wireless resource according to the control information allocation scheme of the present invention as previously described.

If the standard prescribes agreement between an antenna node transmitting control information and an antenna node transmitting data, the base station may signal only information regarding an antenna node transmitting control information or information regarding an antenna node transmitting data to the user equipment.

Meanwhile, the user equipment may transmit information regarding an antenna, antenna node, or antenna group preferred by the user equipment to the base station of the corresponding cell. The information may include an identifier of a reference signal distinguished for each antenna, antenna node, or antenna group. The processor 400*a* of the user equipment may estimates an antenna or antenna node having good channel status using a downlink signal and may control the transmitter 100*a* of the user equipment based thereon to transmit to the user equipment information regarding an antenna node which the base station wishes to use when transmitting downlink control information or data to the user equipment. In a case in which agreement between an antenna node transmitting control information and an antenna node transmitting data is not necessary, the user equipment may separately provide antenna information preferred to transmit control information and antenna information preferred to transmit data to the base station. The processor 400*b* of the base station may allocate an antenna node which will transmit control information or data regarding the user equipment with reference to the antenna node preferred for control information or data provided by the user equipment.

Although, in the above description, embodiments for transmitting antenna information transmitting control information to the user equipment were described, the above-described embodiments may be applied to a case in which antenna information transmitting data is transmitted to the user equipment in the same manner. That is, information regarding an antenna node transmitting data may be clearly transmitted to the corresponding user equipment, data may be transmitted after being masked using an identifier of the corresponding user equipment or an identifier or index of an antenna group, or some or all data may be transmitted after being scrambled for each antenna group.

Relationship with Legacy User Equipments

In the above description, a method of transmitting control information for different user equipments from different antennas or antenna nodes through the same time and frequency resources was described. Also, embodiments for transmitting antenna information together with the control information were described. In a case in which the above-described proposals of the present invention are applied to IEEE 802.16 and 3GPP LTE, how to support legacy user equipments operating based on the conventional IEEE 802.16e/m or 3GPP LTE/LTE-A standard may come into question.

For operation of legacy user equipments, control information regarding the legacy user equipments may be transmitted using all antennas within a predetermined control region, and control information regarding user equipments (hereinafter, referred to as DAS user equipments) operating based on the above proposals may be separately transmitted for each antenna node or antenna group in the predetermined control region.

However, a method of transmitting control information regarding the legacy user equipments and the DAS user equipments on the same control region may badly affect performance improvement of the DAS user equipments due to restrictions required in transmission of a control channel in the current IEEE 802.16m and 3GPP LTE/LTE-A standards.

Figure 13A:
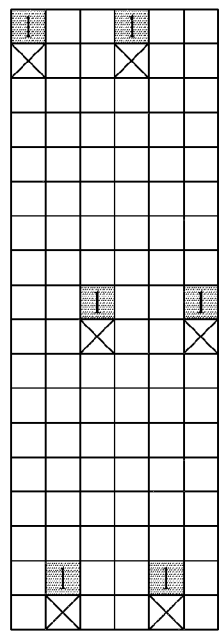
FIG. 13(a) and FIG. 13(b) are views showing an example of pilot patterns for two data stream transmission in IEEE 802.16m.
Figure 13B:
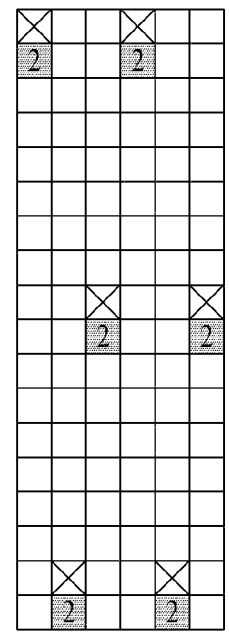

FIG. 13 is a view showing an example of pilot patterns for two data stream transmission in IEEE 802.16m. FIG. 13(*a*) shows a basic pilot pattern on stream 0, which is the first one of the two data streams, and FIG. 13(*b*) shows a basic pilot pattern on stream 1, which is the second one of the two data streams.

For example, according to the IEEE 802.16m standard, various A-MAP information elements (IEs) in an A-MAP region are converted into two MIMO layers through channel coding. The two MIMO layers are converted into two data streams by SFBC encoding performed by the MIMO encoder 303. The two data streams, SFBC encoded and output from the MIMO encoder 303, are precoded by the precoder 304 using a $N_t \times 2$ precoding matrix based on the number $N_t$ of transmit antennas and are transmitted through the respective transmit antennas.

Even if the number of the transmit antennas of the base station is greater than 2, the base station transmits a pilot using only two pilot patterns through an antenna grouping method in the A-MAP region. Even if an A-MAP is received from a base station having more than 2 transmit antennas, therefore, the user equipment can recognize only two data streams. In a case in which such a method is applied to the DAS in order to stably transmit an A-MAP, several antennas, which are spread out, are divided into two antenna groups. The first antenna group simultaneously transmit the A-MAP using a first pilot pattern, and the second antenna group simultaneously transmit the A-MAP using a second pilot pattern. At this time, it is advantageous for each antenna group to secure coverage within which each antenna group reaches all regions in a cell. However, this pilot transmission method is not proper to maximize system efficiency in the DAS. Specially, an SFBC method used for A-MAP transmission is a kind of transmit diversity method, in which two symbols are alternately transmitted to two data streams. Consequently, each stream is not proper to be transmitted to different user equipments in an environment in which the difference between two stream reception intensities of user equipments is great as in the DAS. For example, in a case in which two distributed antennas are present, for a terminal that can receive a signal from only one of the two antennas, only noise is present in one of two physical channels receiving symbols, and such noise may be estimated as a channel. When the symbol is received using this, therefore, reception performance may be greatly lowered due to amplified noise channel.

In a case in which it is necessary to differently set user equipments transmitting control information for each antenna node in the DAS as in the above-described proposal of the present invention, greater difference between pilot reception intensities is preferable for the user equipments. In other words, in a case in which the difference between the intensity of a signal from an antenna node adjacent to a user equipment and the intensity of a signal from an antenna node distant from the user equipment is great, interference between the antenna nodes is low, and therefore, it is possible to simultaneously transmit different control information for each antenna node to different user equipments. Low signal interference between the antenna nodes is an essential factor to transmit information important in data reception and/or decoding, such as an A-MAP, to the user equipment. However, if an A-MAP must be unconditionally transmitted using two pilot patterns as required in IEEE 802.16m, all of the DAS antennas must be transmitted after being virtualized so that all of the DAS antennas can be recognized as two antennas in the control region. This may restrict control channel efficiency improvement of DAS user equipments (user equipments configured according to a standard supporting the DAS after IEEE 802.16m) receiving control information on the control region. For example, in a case which DAS antennas are densely arranged, the reception intensity of two pilots transmitted from two antenna groups to the user equipment become great. In a case in which control information of two user equipment is transmitted on the same resource according to the scheme proposed by the present invention, signal interference between the two pilots is great with the result that a control information transmission rate of the two user equipment may be reduced. Also, a great number of antennas or antenna nodes may be present in the DAS. If an A-MAP is transmitted through only two data streams according to the conventional method, the A-MAP may be simultaneously transmitted to a maximum of two user equipments.

In 3GPP LTE/LTE-A, on the other hand, a PDCCH may be transmitted using a CRS only through a single antenna or in a transmit diversity mode. The current 3GPP LTE/LTE-A does not prescribe that a plurality of antennas or antenna nodes belonging to a specific base station transmits different PDCCHs through the same resource. For example, if a PDCCH is transmitted through a single antenna, a codeword is mapped to a data stream. That is, the number $M_t$ of data steams output from the layer mapper 303 is 1, and, even if a base station includes a plurality of transmit antennas, the base station transmits the PDCCH through a physical antenna or a virtual antenna based on an antenna grouping method. Even if the user equipment receives the PDCCH from a base station including a plurality of transmit antennas, therefore, the user equipment can recognize only one data stream. As another example, if a PDCCH is transmitted in a diversity mode, a codeword is mapped to two or four data streams. At this time, it is prescribed that only one codeword can be transmitted on the same resource. In the PDCCH, therefore, multi user MIMO transmission, which transmits multiple codewords using the same resource, is not possible.

For multi user MIMO transmission, the PDCCH must be transmitted in a space multiplexing mode. Although not prescribed in the current LTE/LTE-A, the user equipment must receive the PDCCH using a CRS even if the PDCCH can be transmitted in a space multiplexing mode. Multi user MIMO transmission using the CRS is not impossible, but the base station must notify even a PMI applied to a data stream transmitted to each user equipment and a PMI applied to a data stream transmitted to another user equipment to the respective user equipments. For this reason, the multi user MIMO transmission has great overhead and is complicated.

Also, in a case in which control information is transmitted on the same resource to a plurality of user equipments using the CRS, a reference signal for each combination of antennas has to be defined. Consequently, implementation is complicated, and overhead in transmission of the reference signal is increased.

In conclusion, only an A-MAP with respect to a maximum of two user equipments can be transmitted on the same resource according to the current IEEE 802.16 standard, and only a PDCCH can be transmitted on the same resource according to the current 3GPP LTE/LTE-A standard.

In order to solve the above problems, the present invention defines a new control channel for DAS user equipments and provides a method of transmitting the new control channel on a resource different from the conventional control channel. The DAS user equipments are implemented to recognize corresponding control information from the new control channel. Hereinafter, a control channel defined according to the standard prescribed under the current CAS system will be referred to as a CAS-control channel, and the above channel for the DAS will be referred to as a DAS-control channel. Also, a predetermined time and/or frequency resource to which the CAS-control channel can be allocated will be referred to as a CAS-control region, and a predetermined time and/or frequency resource to which the SAS-control channel can be allocated will be referred to as a SAS-control region. In addition, user equipments which do not support a function according to the DAS standard will be referred to as legacy user equipments or CAS user equipments, and user equipments implemented according to the DAS standard will be referred to as DAS user equipments.

According to a standard prescribed in the current IEEE 802.16m or 3GPP LTE/LTE-A, control information regarding CAS user equipments, which are legacy user equipments, may be transmitted to the CAS user equipments using all antennas of the base station within the conventional control region. In a case in which a new standard prescribes that control information regarding DAS user equipments moving at high speed must be transmitted through all antennas, control information regarding the DAS user equipments as well as the CAS user equipment may be transmitted to the corresponding user equipments though the conventional control region. Control information regarding DAS user equipments moving at low speed may be transmitted to the corresponding user equipments through a new control channel.

The base station processor 400b may control the base station transmitter 100b to allocate control information of the legacy user equipments to the CAS-control channel and to allocate control information of the DAS user equipments to the DAS-control channel newly defined for the DAS user equipments. Under control of the base station processor 400b, the base station transmitter 100b may transmit the CAS-control channel on the CAS-control region and may transmit the DAS-control channel on a resource region different from the CAS-control region.

Allocation information indicating the size and/or position of the DAS-control region may be transmitted through an upper message or may be transmitted on the CAS-control region. The base station processor 400b may generate an upper message including the allocation information indicating the size and/or position of the DAS-control region and may control the base station transmitter 100b to transmit the upper message. Alternatively, the base station processor 400b may generate the allocation information and may control the base station transmitter 100b to transmit the allocation information on the CAS-control region.

Also, the number of MIMO streams or the number of reference signals or pilots used in the DAS-control region may be different from the number of MIMO streams or the number of reference signals or pilots used in the CAS-control region. Consequently, information indicating the number of MIMO streams or the number of reference signals or pilots may be transmitted through an upper message or may be transmitted on the CAS-control region. The base station processor 400b may generate an upper message including information indicating the number of MIMO streams or the number of reference signals or pilots used in the DAS-control region and may control the base station transmitter 100b to transmit the upper message. Alternatively, the base station processor 400b may generate the information and may control the base station transmitter 100b to transmit the information on the CAS-control region.

In transmitting control information through the DAS-control channel, information regarding an antenna node allocated to a user equipment may be signaled to the user equipment according to at least one of the above-described embodiments 1 to 3. That is, the above-described embodiments 1 to 3 for signaling antenna information may be combined with the present method of transmitting control information to a user equipment through the DAS-control region to maintain compatibility with legacy user equipments.

Hereinafter, embodiments in which the DAS is applied to IEEE 802.16 and embodiments in which the DAS is applied to 3GPP LTE will be described.

DAS according to IEEE 802.16

A MAP region for DAS different from the conventional A-MAP region (hereinafter, referred to as a CAS A-MAP region) is further provided for DAS user equipments. The MAP region for DAS (hereinafter, referred to as a DAS-MAP region) is a region on which a DAS-MAP carrying control information regarding user equipments based on a new standard supporting the DAS. A-MAP IEs (for example, an assignment A-MAP IE, HARQ feedback A-MAP IE, power control A-MAP IE, non-user specific A-MAP IE, etc.) are partially or entirely transmitted to the DAS-MAP. Also, an additional IE for DAS operation may be transmitted using the DAS-MAP region except the current A-MAP IE which is not related to the DAS. In the new DAS-MAP region, a pilot pattern divided for each antenna, antenna node, or specific antenna group is used to transmit control information according to the present invention.

For reference, a non-user specific A-MAP includes information which is not limited to a specific user or a specific user group. The user equipment decodes the non-user specific A-MAP in the primary frequency partition to acquire information necessary to decode an assignment A-MAP and a HARQ feedback A-MAP. For example, the non-user specific A-MAP may carry parameters, such as transmission parameters used to calculate the size of the assignment A-MAP and an index of the HARQ feedback A-MAP. The HARQ feedback A-MAP carries HARQ ACK/NACK information for uplink data transmission, and a power control A-MAP carries a fast power control command to the user equipment. The assignment A-MAP includes resource allocation information divided into several types of assignment A-MAP IEs. Each assignment A-MAP IE is separately coded to carry information regarding a user equipment or user equipment group.

Figure 14:
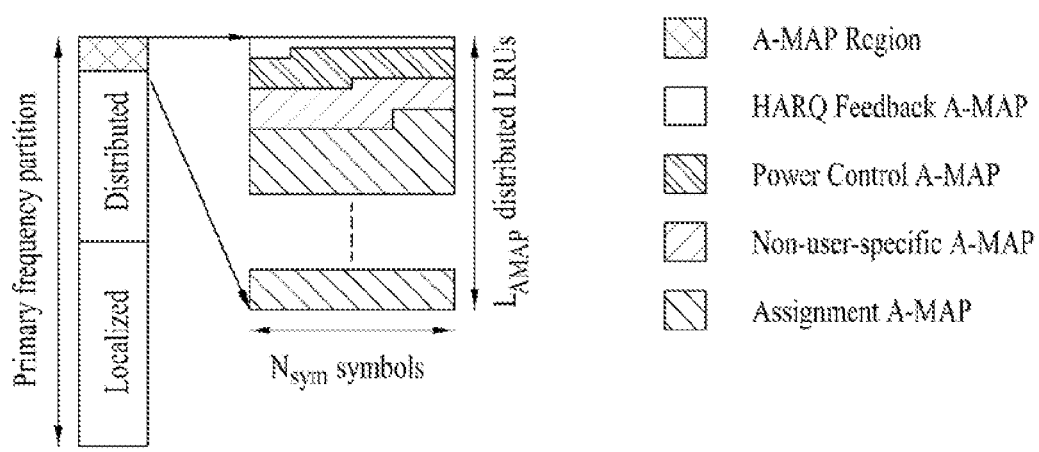
FIG. 14 is a view showing an example of an A-MAP structure in a primary frequency partition in IEEE 802.16m.

FIG. 14 is a view showing an example of an A-MAP structure in a primary frequency partition in IEEE 802.16m.

According to current IEEE 802.16, an A-MAP region is present at a Distributed Logical Resource Unit (DLRU) position in a primary frequency partition, such as a reuse-1 partition or a power-boosted reuse-3 partition. For example, in the case of a subframe except a first subframe, an A-MAP region includes initial $L_{AMAP}$ DLRUs. On the other hand, in the case of the first subframe of the superframe, an A-MAP region includes $L_{AMAP}$ DLRUs following the initial $L_{AMAP}$ DLRUs occupied by an SFH. LRUs are formed from Physical Resource Units (PRUs). Each PRU is a basic physical unit of resource assignment including $P_{sc}$ successive subcarriers and $N_{sym}$ successive OFDMA symbols. For example, each PRU may include $P_{sc}=18$ subcarriers, and may include $N_{sym}=6$, 7, and 5 OFDMA symbols with respect to type-1, type-2, and type-3 subframes, respectively. Each LRU is a basic unit for distributed or localized resource assignment. A resource occupied by each A-MAP may be changed depending upon system configuration and scheduler operation.

The DAS-MAP region proposed by the present invention may include DLRUs different from the CAS-MAP region.

Embodiments regarding configuration of the DAS-MAP region will be described as follows.

(1) Embodiment X

In the DAS-MAP region, an A-MAP IE for each DAS user equipment is transmitted, and information which is not specific to a specific DAS user equipment is transmitted through the conventional non-user specific A-MAP IE. That is, DAS user equipments may share some or all of non-user specific A-MAP IEs with legacy user equipments. The non-user specific A-MAP IEs carry various kinds of information necessary for the user equipments to recognize user specific A-MAP IEs. In a case in which user specific A-MAP IEs to be transmitted on the DAS-MAP region and user specific A-MAP IEs to be transmitted on the CAS A-MAP region are configured by common parameters, therefore, it may not be necessary to separately configure non-user specific IEs in the DAS-MAP region.

A legacy user equipment may decode a non-user specific A-MAP IE transmitted on the CAS A-MAP region in the primary frequency partition and may acquire information necessary to decode a user specific A-MAP IE in the CAS A-MAP region using the non-user specific A-MAP IE. The DAS user equipment may decode a non-user specific A-MAP IE transmitted on the CAS A-MAP region in the primary frequency partition and may acquire information necessary to decode a user specific A-MAP IE in the DAS-MAP region using the non-user specific A-MAP IE.

(2) Embodiment Y

In the same manner as in embodiment X, legacy user equipments and DAS user equipments share some or all of non-user specific A-MAP IEs. Unlike embodiment X in which the DAS user equipments do not share user specific A-MAP IEs with the legacy user equipments, however, the DAS user equipments according to embodiment Y may share some or all of the user specific A-MAPs.

For example, user specific A-MAP IEs transmitted for legacy user equipments are information that can be transmitted even for DAS user equipments without change. Consequently, some or all selected from among a HARQ feedback A-MAP IE, allocation A-MAP IE, power control A-MAP IE may be transmitted on the CAS A-MAP region, and information added for DAS operation may be transmitted on the DAS-MAP region. The information added for DAS operation may include transmit antenna information used in data transmission from the data region.

As another example, A-MAP IEs regarding the legacy user equipments may be transmitted on the CAS A-MAP region, and A-MAP IEs regarding the DAS user equipments may be transmitted through the A-MAP region or the DAS-MAP region.

Each DAS user equipment may blind decode the CAS A-MAP region and the DAS-MAP region to find an A-MAP IE thereof. At this time, in order to reduce computing power of the user equipment necessary for blind decoding, when an event in which the transmission structure of a radio frame will be changed due to cell entry, reentry, node change, etc. has occurred, the base station may semi-statically transmit an A-MAP IE of the user equipment so that the user equipment performs blind decoding only in a first subframe received after the event has occurred. The user equipment may perform blind decoding only with respect to the first subframe to detect an A-MAP IE thereof, and may receive or detect an A-MAP IE on a region from which the A-MAP IE has been transmitted without blind decoding with respect to subframes following the first subframe. However, the region from which the A-MAP IE is transmitted may be changed depending upon various situations, such as the position of the user equipment or traffic of the base station. Indication information regarding whether the region on which the A-MAP IE is transmitted is changed at the next subframe may be signaled to the user equipment through a MAC message or a user specific A-MAP IE (for example, an allocation A-MAP IE).

Alternatively, indication information regarding whether the region on which the A-MAP IE is transmitted is a CAS A-MAP region or a DAS-MAP region may be added to a predetermined region of the CAS A-MAP region or the DAS-MAP region. The user equipment may first read the indication information in the predetermined region to recognize a region on which an A-MAP IE thereof is transmitted. The user equipment may perform blind decoding at the region indicated by the indication information to obtain an A-MAP IE thereof.

(3) Embodiment W

An A-MAP IE regarding a DAS user equipment is transmitted through a DAS-MAP region. A non-user specific A-MAP IE and a user specific A-MAP IE regarding a legacy user equipment are transmitted on a CAS A-MAP region, and a non-user specific A-MAP IE and a user specific A-MAP IE regarding a DAS user equipment are transmitted on the DAS-MAP region. Unlike embodiment X and embodiment Y, an A-MAP IE for an DAS user equipment is not transmitted on an A-MAP region. Consequently, the DAS user equipment acquires a non-user specific A-MAP IE for a DAS user equipment and an A-MAP IE regarding DAS user equipment on the DAS-MAP region.

In the above-described embodiments X to W, the position and/or size of the DAS-MAP region may be previously set according to a standard. For example, the DAS-MAP region may be defined to be configured by initial $L_{DASMAP}$ DLRUs in a predetermined frequency partition except the primary frequency partition in which the CAS A-MAP region is located.

In the above-described embodiments X to W, the position and/or size of the DAS-MAP region may not be previously set according to a standard but may be signaled to the user equipment through an SFH(P-SFH IE or S-SFH IE) or MAC message (for example, an Advanced Air Interface System Configuration Descriptor (AAI_SCD) message or an AAI DownLink Interference Mitigation parameter (AAI_DL_IM) message).

The base station processor 400*b* according to the present invention may generate A-MAP IEs necessary for DAS user equipments and may allocate the A-MAP IEs to the CAS A-MAP region or the DAS-MAP region according to any one of embodiments X to W. Under control of the base station processor 400*b*, the base station transmitter 100*b* may transmit IEs to be accessed by legacy user equipments after being allocated to the CAS A-MAP region and may transmit IEs to be accessed by DAS user equipments after being allocated to the CAS A-MAP region or the DAS-MAP region according to any one of embodiments X to W.

The processor 400*a* of each DAS user equipment may acquire an A-MAP IE necessary therefor according to any one of embodiments X to W. Under control of the processor 400*b*, the receiver 300*a* of each DAS user equipment may receive an A-MAP necessary for reception and/or decoding of data thereof on the CAS A-MAP region or the DAS-MAP region. The processor 400*a* may control the receiver 300*a* to receive and/or decode data thereof transmitted on the data region using A-MAP IEs carried by the A-MAP.

According to the present invention, the DAS-MAP region is located at a Contiguous RU (CRU) or a Distributed resource unit (DRU) at which the CAS A-MAP region is not present. LRUs may be divided into Distributed LRUs (DLRUs) which are distributed throughout the whole frequency bands of a physical channel and Contiguous LRUs (CLRUs) which are concentrated at a specific frequency band of the physical channel. Each CLRU may be divided into a subband CLRU and a miniband CLRU. Since the DLRUs are distributed throughout the whole frequency bands of the physical channel, user equipments allocated to the DLRUs must share pilots allocated to the DRUs which are distributed throughout the whole frequency bands. Consequently, if the DAS-MAP region is allocated to the DLRU region to which the CAS A-MAP region is allocated, the DAS user equipments must share pilots allocated to the DLRU. As a result, as described with reference to FIG. 13, a problem that only two pilot patterns must be used is generated. In a case in which control information different for each antenna node proposed by the present invention is transmitted, therefore, a maximum of 2 different control information can be transmitted. Consequently, it is preferable for the DAS-MAP region to be located at a Contiguous Resource Unit (CRU) or a DRU at which the A-MAP region is not present. For example, the DAS-MAP region may be located at the DRU of the remaining frequency partition except the primary frequency partition which is power-boosted when an FFR is applied. The base station processor 400b may control the base station transmitter 100b to allocate the DAS-MAP region to the CRU or the DRU at which the CAS A-MAP region is not present. Under control of the base station processor 400b, the base station transmitter 100b may allocate a DAS-MAP to the CRU or the DRU at which the CAS A-MAP region is not present.

Meanwhile, the base station may signal pilot configuration information of the DAS-MAP region and/or MIMO transmission information of the DAS-MAP region to the user equipment. Information regarding the number of pilots and information regarding pilot patterns may be signaled to the user equipment as the pilot configuration information, and encoding information, precoding information, and information regarding the number of multiplexed streams may be signaled to the user equipment as the MIMO transmission information. MCS level information, code rate information, modulation order information, and burst size information may be utilized as the encoding information. The pilot configuration information and/or the DAS-MAP information may be transmitted to the user equipment through an SFH, non-user specific A-MAP IE, or MAC message (for example, an AAI_SCD message or an AAI_DL_IM message). The SFH, non-user specific A-MAP IE, or MAC message may include one or more selected from among position information of the DAS-MAP region, size information of the DAS-MAP region, pilot configuration information of the DAS-MAP region, and MIMO transmission information. Alternatively, some or all selected from among the position information of the DAS-MAP region, the size information of the DAS-MAP region, the pilot configuration information of the DAS-MAP region, and the MIMO transmission information may be named as individual IEs for DAS-MAPs and may be transmitted to the user equipment through the A-MAP region or the DAS-MAP region.

According to the embodiments of the present invention as described above, more than 2 pilot patterns may be used in the DAS-MAP region so that other MIMO transmission technologies (for example, space multiplexing) except the SFBC can be used to transmit control information. For example, in a case in which the pilot configuration information and the MIMO transmission information are transmitted to the user equipment, the user equipment may find control information thereof from the DAS-MAP region using the pilot configuration information and the MIMO transmission information. For example, in a case in which antenna information is not clearly signaled, the user equipment may find a pilot, antenna, antenna node, and/or antenna group associated with control information of the user equipment from the DAS-MAP region using various pilot combinations based on the pilot configuration information and may find control information of the user equipment in the DAS-MAP region using a channel estimated through the pilot.

DAS According to 3GPP LTE

As previously mentioned, each antenna transmits the same control information on the control region according to the current 3GPP LTE. According to the regulations of the current 3GPP LTE, therefore, it is not possible to transmit control information different for each antenna node.

If the regulations of the current 3GPP LTE are applied to a DAS standard without change, it is not possible to transmit a PDCCH different for each antenna node from the current control region, e.g. first three successive symbol sections of a subframe. Consequently, the present invention defines a control region (hereinafter, referred to as a DAS-PDCCH region) on which a PDCCH (hereinafter, referred to as a DAS-PDCCH) for a DAS user equipment is transmitted, which is different from a control region (hereinafter, referred to as a CAS-PDCCH region) on which a PDCCH (hereinafter, referred to as a CAS-PDCCH) for a legacy user equipment is transmitted.

According to the current 3GPP LTE, a PDCCH may be transmitted in first three symbols of a subframe. That is, a PDCCH may be allocated to first three symbols of a subframe. As previously mentioned, the number of symbols in which a PDCCH is transmitted may be changed depending upon the number and/or size of PDCCHs to be transmitted. For example, in a case in which first three symbols are utilized as a CAS-PDCCH region, the base station transmits a CAS-PDCCH(s) for a legacy user equipment(s) in the first three symbols of a subframe through an antenna or all antennas. The base station transmits a DAS-PDCCH(s) to some of the remaining symbols except the three symbols. In this case, the base station may transmit DAS-PDCCHs different for each antenna node. For example, the base station may transmit the DAS-PDCCH(s) from a predetermined number of symbols following the front symbols at which the CAS-PDCCH region is located or may transmit the DAS-PDCCH(s) on at least one of PRBs in a PDSCH region of the subframe.

Meanwhile, the base station may signal reference signal configuration information of the DAS-PDCCH region and/or MIMO transmission information of the DAS-PDCCH region to the user equipment. Information regarding the number of reference signals and information regarding reference signal patterns may be signaled to the user equipment as the reference signal configuration information, and encoding information, precoding information, and information regarding the number of multiplexed streams may be signaled to the user equipment as the MIMO transmission information. MCS level information, code rate information, modulation order information, and burst size information may be utilized as the encoding information.

For example, referring to FIGS. 8 and 9, ANT1 and ANT2 transmit a DAS-PDCCH regarding UE1 and a DAS-PDCCH regarding UE2 on the DAS-PDCCH region, and ANT3 and ANT4 transmit a DAS-PDCCH regarding UE3 and a DAS-PDCCH regarding UE2 on the DAS-PDCCH region. Also, ANT1 to ANT 4 may transmit CAS-PDCCHs regarding legacy user equipments from the conventional control region.

The base station processor 400b controls the transmitter 100b to allocate a CAS-PDCCH to the conventional control region to which the conventional PDCCH in the subframe can be allocated and controls the transmitter 100b to allocate a DAS-PDCCH to the DAS-PDCCH region. Under control of the base station processor 400b, the resource element mapper 305 may allocated the DAS-PDCCH to the DAS-PDCCH region.

Each legacy user equipment may blind decode CAS-PDCCHs transmitted on the conventional control region to detect a PDCCH thereof. Each DAS user equipment may blind decode CAS-PDCCHs transmitted on the DAS-PDCCH region to detect a PDCCH thereof.

The processor 400a of the DAS user equipment may blind decode a set of DAS-PDCCH candidates in the DAS-PDCCH region to detect a PDCCH thereof. The processor 400a may demask the DAS-PDCCH candidates using an identifier thereof to recognize a PDCCH having no CRC error as a PDCCH thereof and may control the receiver 300a to receive and/or decode data thereof transmitted on the data region using control information transmitted through the PDCCH.

Meanwhile, a new reference signal may be defined for each number of data streams to which DAS-PDCCHs are transmitted and may be transmitted separately with CRSs. The user equipment may use the new reference signal to estimate channel status, to demodulate a data stream thereof, which is one of a plurality of data streams transmitted by the base station, or to detect a data stream including control information or data thereof from among a plurality of data streams transmitted by the base station. In a case in which a CRS is not defined and transmitted for each antenna combination but a new reference signal is defined and transmitted for each number of data streams, reference signals are differently defined according to the number of data streams that can be simultaneously transmitted, i.e. ranks, and therefore, it is possible to reduce overhead of reference signal transmission as compared with a case in which the CRS is used. Also, such a reference signal is transmitted after the same precoder as the other data signals of the corresponding resource region being applied to the reference signal, and therefore, it is not necessary for the base station to inform a terminal of precoder information (PMI information). Such a reference signal, a reference signal pattern of which is changed according to the precoder and the number of data streams is also referred to as a DeModulation Reference Signal (DMRS). A DMRS with respect to a data stream is transmitted on the corresponding data stream, DMRSs on different data streams are defined so as to be mutually orthogonal so that the DMRSs can be used to demodulate information transmitted through the data streams. In order for the base station to simultaneously transmit different DAS-PDCCHs to various user equipments through the same resource, therefore, it is advantageous to transmit the DMRSs on the DAS-PDCCH region so that the user equipments can demodulate the DAS-PDCCHs.

According to the current IEEE 802.16 and 3GPP LTE, a control channel may be allocated and transmitted every subframe. That is, a CAS-PDCCH is transmitted in first three symbols every subframe, and a CAS A-MAP is transmitted on a DLRU in the primary frequency partition every subframe. In the above description, a case in which a control channel is transmitted every subframe even in the DAS system was assumed, and an embodiment for transmitting a DAS-PDCCH or DAS-MAP together with a CAS-PDCCH or CAS A-MAP on a resource region different from a CAS-PDCCH region or CAS A-MAP region every subframe was described.

In a case in which it is defined that a user equipment supported for each subframe is differently set in the DAS system, however, a DAS control channel may be allocated to a region to which the conventional CAS control channel is allocated. For example, in a case in which a base station wishes to transmit a PDCCH, the base station may transmit a DAS-PDCCH in the first three symbols of a DAS subframe and may transmit a CAS-PDCCH in the first three symbols of a CAS subframe. On the other hand, in a case in which the base station wishes to transmit an A-MAP, the base station may transmit DAS-MAP IEs on the primary frequency partition of the DAS subframe and may transmit CAS A-MAP IEs on the primary frequency partition of the CAS subframe. Information indentifying which subframe is a DAS subframe or a CAS subframe may be signaled to a user equipment through a PCH, SFH, PBSH, SIB, etc.

The above embodiments described to solve compatibility with legacy user equipments are provided to achieve the proposal of the present invention to transmit different control information on a predetermined resource region for each antenna or antenna node under a premise that restriction conditions of control channel transmission required by the current IEEE 802.16 and 3GPP LTE are effective. If such restriction conditions are not present in transmission of control information, it is possible to transmit different control information on a predetermined resource region for each antenna or antenna node without newly prescribing a DAS-MAP and a DAS-PDCCH.

In IEEE 802.16, if it is not necessary to transmit an A-MAP in the form of two data streams unlike conditions required by the current IEEE 802.16m, a base station may configure various A-MAP IEs into more than 2 data streams and may transmit pilots according to pilot patterns based on the number of the data streams.

Figure 15:
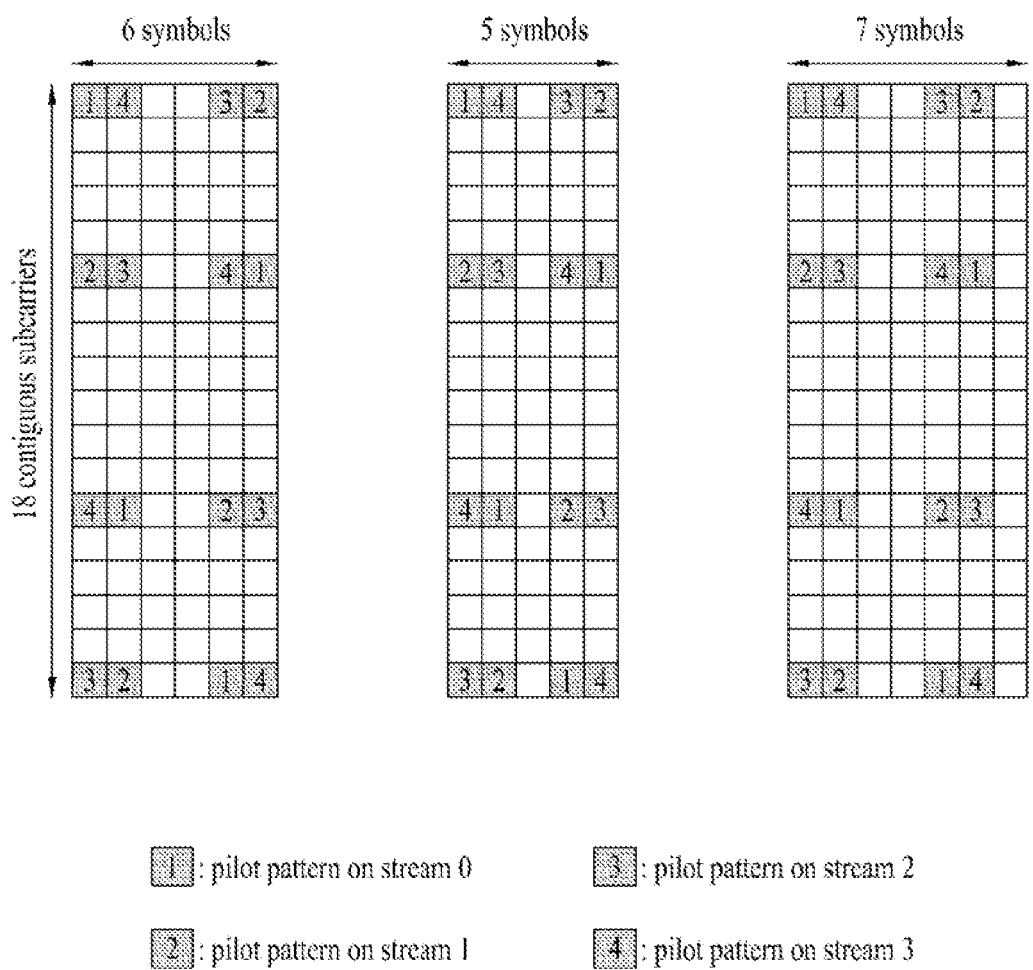
FIG. 15 is a view showing an example of pilot patterns for four data stream transmission in IEEE 802.16m.

FIG. 15 is a view showing an example of pilot patterns for four data stream transmission in IEEE 802.16m. For example, referring to FIG. 15, if A-MAP IEs are transmitted after being configured into four data streams, the base station groups antennas into four antenna groups in an A-MAP region using an antenna grouping method and transmits pilots using four pilot patterns. Each antenna group may simultaneously transmit A-MAP information to be transmitted by the corresponding antenna group using a corresponding one of the four pilot patterns.

In 3GPP LTE, if space multiplexing is applied to transmission of a PDCCH, the base station may transmit different control information on a predetermined control region for each antenna node. Control information regarding a legacy user equipment or a DAS user equipment moving at high speed may be transmitted through all antennas. In this case, the DAS user equipment may receive or acquire control information thereof using a CRS of an antenna or antenna node allocated to the control information thereof. The legacy user equipment may estimate channel status between antenna nodes of the base station and the legacy user equipment using all CRSs and may receive only control information thereof from control information transmitted by the base station based thereupon, or may acquire control information thereof from the received control information through blind decoding. The DAS user equipment moving at high speed may use all CRSs to receive control information thereof or to acquire control information thereof.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used in a multi-node system providing a communication service to a user equipment or a user equipment group through a plurality of nodes.

The invention claimed is:

1. A method of receiving, by a user equipment, control information from a base station, the method comprising:

receiving the control information through a physical downlink control channel in a downlink subframe and a demodulation reference signal for the physical downlink control channel in the downlink subframe;

decoding the control information based on the demodulation reference signal; and decoding downlink data for the user equipment based on the control information, wherein the downlink subframe is divided into a first control region and a data region in a time domain, wherein the physical downlink control channel is allocated in a second control region configured in the data region, and wherein the demodulation reference signal is received on the second control region.

2. The method according to claim 1, further comprising:

receiving at least size information of the second control region, position information of the second control region, or information indicating a number of layers for the physical downlink control channel.

3. The method according to claim 1, wherein the demodulation reference signal is received per layer of the physical downlink control channel.

4. The method according to claim 1, wherein the second control region is configured on at least one physical resource block (PRB) among a plurality of PRBs of the downlink subframe.

5. The method according to claim 1, wherein the downlink data for the user equipment is received in the data region based on the control information.

6. A user equipment for receiving control information, the user equipment comprising:

a receiver; and a processor operatively connected to the receiver and configured to:

control the receiver to receive the control information through a physical downlink control channel in a downlink subframe and a demodulation reference signal for the physical downlink control channel in the downlink subframe;

decode the control information based on the demodulation reference signal; and decode downlink data for the user equipment based on the control information, wherein the downlink subframe is divided into a first control region and a data region in a time domain, wherein the physical downlink control channel is allocated in a second control region configured in the data region, and wherein the demodulation reference signal is received on the second control region.

7. The user equipment according to claim 6, wherein the processor is further configured to control the receiver to receive at least size information of the second control region, position information of the second control region, or information indicating a number of layers for the physical downlink control channel.

8. The user equipment according to claim 6, wherein the demodulation reference signal is received per layer of the physical downlink control channel.

9. The user equipment according to claim 6, wherein the second control region is configured on at least one physical resource block (PRB) among a plurality of PRBs of the downlink subframe.

10. The user equipment according to claim 6, wherein the processor is further configured to control the receiver to receive the downlink data for the user equipment in the data region based on the control information.

* * * * *